US009493605B2

United States Patent
Amou

(10) Patent No.: US 9,493,605 B2
(45) Date of Patent: Nov. 15, 2016

(54) EPOXY-VINYL COPOLYMERIZATION TYPE LIQUID RESIN COMPOSITION, CURED PRODUCT OF THE SAME, ELECTRONIC/ELECTRIC APPARATUS USING THE CURED PRODUCT, AND METHOD OF PRODUCING THE CURED PRODUCT

(71) Applicant: Hitachi Industrial Equipment Systems Co., Ltd., Chiyoda-ku, Tokyo (JP)

(72) Inventor: Satoru Amou, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 32 days.

(21) Appl. No.: 14/374,778

(22) PCT Filed: Feb. 19, 2013

(86) PCT No.: PCT/JP2013/053920
§ 371 (c)(1),
(2) Date: Jul. 25, 2014

(87) PCT Pub. No.: WO2013/172064
PCT Pub. Date: Nov. 21, 2013

(65) Prior Publication Data
US 2014/0378580 A1 Dec. 25, 2014

(30) Foreign Application Priority Data
May 16, 2012 (JP) .................................. 2012-112461
Nov. 21, 2012 (JP) .................................. 2012-254899

(51) Int. Cl.
*C08G 59/42* (2006.01)
*C08G 65/00* (2006.01)
(Continued)

(52) U.S. Cl.
CPC .......... *C08G 59/245* (2013.01); *C08F 283/10* (2013.01); *C08G 59/4014* (2013.01);
(Continued)

(58) Field of Classification Search
CPC ...................................................... C08G 59/42
USPC ......................................................... 523/438
See application file for complete search history.

(56) References Cited

U.S. PATENT DOCUMENTS 4,503,200 A 3/1985 Corley
4,603,180 A 7/1986 Nakajima et al.
(Continued)

FOREIGN PATENT DOCUMENTS

JP 61-148230 A 7/1986
JP 62-43412 A 2/1987
(Continued)

OTHER PUBLICATIONS

Murai et al., JP 09-249740 A machine translation in English, Sep. 22, 1997.*
(Continued)

*Primary Examiner* — David Karst
(74) *Attorney, Agent, or Firm* — Crowell & Moring LLP

(57) ABSTRACT

The present invention provides an epoxy-vinyl copolymerization type liquid resin composition and a cured product of the same. The resin composition contains: an epoxy resin having an epoxy resin equivalent of not more than 200 g/eq; an acid anhydride having an unsaturated double bond that is liquid at normal temperature or the acid anhydride having an unsaturated double bond that is liquid at normal temperature and maleic anhydride; a polyfunctional monomer which is liquid at normal temperature; an epoxy resin curing catalyst which accelerates a curing reaction of the epoxy resin with the acid anhydride or with the acid anhydride and maleic anhydride; and a radical polymerization catalyst which accelerates a curing reaction of the polyfunctional monomer.

10 Claims, 5 Drawing Sheets

(51) Int. Cl.
  C08L 63/00    (2006.01)
  C08G 59/24    (2006.01)
  C08G 59/40    (2006.01)
  C08G 59/68    (2006.01)
  H01B 3/40     (2006.01)
  C08F 283/10   (2006.01)
  C08K 3/36     (2006.01)

(52) U.S. Cl.
  CPC ........... *C08G59/42* (2013.01); *C08G 59/68* (2013.01); *C08L 63/00* (2013.01); *H01B 3/40* (2013.01); *C08K 3/36* (2013.01); *C08L 2203/20* (2013.01); *C08L 2205/03* (2013.01); *C08L 2205/05* (2013.01)

(56) References Cited

U.S. PATENT DOCUMENTS

| | | | |
|---|---|---|---|
| 4,652,619 A | 3/1987 | Nakajima et al. | |
| 5,821,305 A | 10/1998 | Schutyser et al. | |
| 5,982,056 A | 11/1999 | Koyama et al. | |
| 2001/0023983 A1* | 9/2001 | Kobayashi | H01L 23/49894 257/698 |
| 2010/0319964 A1 | 12/2010 | Ootake et al. | |

FOREIGN PATENT DOCUMENTS

| | | | | |
|---|---|---|---|---|
| JP | 5-505376 A | 8/1993 | | |
| JP | 6-233486 A | 8/1994 | | |
| JP | 8-109316 A | 4/1996 | | |
| JP | 9-249740 A | 9/1997 | | |
| JP | 9-316167 A | 12/1997 | | |
| JP | 11-255864 A | 9/1999 | | |
| JP | 2003-277471 A | 10/2003 | | |
| JP | 2003277579 A | * | 10/2003 | ............ C08L 63/00 |
| JP | 2004074799 A | * | 3/2004 | ............ B32B 15/08 |
| JP | 2004-203955 A | 7/2004 | | |
| JP | 2009185232 A | * | 8/2009 | ............ C08L 63/00 |
| JP | 2010-193673 A | 9/2010 | | |
| JP | 2011-1424 A | 1/2011 | | |
| JP | 2011-57734 A | 3/2011 | | |
| JP | 2013-256637 A | 12/2013 | | |

OTHER PUBLICATIONS

Mori et al., JP 2009-185232 A machine translation in English, Aug. 20, 2009.*

Takanezawa, JP 2004-074799 A machine translation in English, Mar. 11, 2004.*

Asano et al, JP 2003-277579 A machine translation in English, Oct. 2, 2003.*

International Search Report dated May 14, 2013 with English translation (five (5) pages).

Extended European Search Report issued in counterpart European Application No. 13790677.2 dated Dec. 21, 2015 (7 pages).

* cited by examiner

EPOXY-VINYL COPOLYMERIZATION TYPE LIQUID RESIN COMPOSITION, CURED PRODUCT OF THE SAME, ELECTRONIC/ELECTRIC APPARATUS USING THE CURED PRODUCT, AND METHOD OF PRODUCING THE CURED PRODUCT

TECHNICAL FIELD

The present invention relates to an epoxy-vinyl copolymerization type liquid resin composition (hereinafter referred to as varnish), a cured product of the same, a method of producing the cured product, and an electronic/electric apparatus using the cured product as an insulating material or/and a structural material.

BACKGROUND ART

Concerning electronic/electric apparatuses, reductions in size and weight have been progressing. This trend is attended by increases in current density and heating value of the apparatuses, and insulating materials used in the apparatuses have been required to have higher heat resistance. Meanwhile, epoxy resins, which are low in cost and high in adhesion properties, heat resistance, processability and the like, have been widely used as insulating material for electronic/electric apparatuses. Exemplary techniques for enhancing the heat resistance of epoxy resin include the introduction of a rigid structure, for example, a naphthalene skeleton, as described in Patent Document 1, and the application of a polyfunctional epoxy resin having three or more epoxy groups in its structure, as described in Patent Documents 2 and 3.

Similarly, the techniques for realizing stiffness and higher functionality has been investigated for their application to acid anhydrides used as a curing agent for epoxy resin. Examples of such investigation include methylnadic anhydride (MHAC-P, produced by Hitachi Chemical Co., Ltd.; acid anhydride equivalent: 178), methylhexahydrophthalic anhydride (HN-5500, produced by Hitachi Chemical Co., Ltd.; acid anhydride equivalent: 168), and methyltetrahydrophthalic anhydride (HN-2200, produced by Hitachi Chemical Co., Ltd.; acid anhydride equivalent: 166) which are described in Patent Document 2. In Examples 52 to 54 in the document, it is shown that a heat resistant temperature index increases with an increase in acid anhydride equivalent, in other words, with an increase in molecular weight. In addition, Patent Document 4 discloses an example of the use of methylcyclohexenetetracarboxylic dianhydride (which is tetrafunctional) as a curing agent. It is described in the document that in the exemplary case the glass transition temperature is elevated, as compared with the case where methylhexahydrophthalic anhydride is used as a curing agent.

Besides, Patent Document 5 discloses that when 2 to 10% by weight of triallyl cyanate is blended into an epoxy resin composition in which SMA (a copolymer of maleic anhydride and styrene) is used as a curing agent, the cured product shows a raised glass transition temperature. In the cases where an epoxy resin made polyfunctional and rendered stiff, an acid anhydride made polyfunctional, and/or an acid anhydride having a large molecular weight is used to enhance the heat resistance of insulating material, the varnish is raised in melting temperature and viscosity, leading to lowered moldability.

In addition, insulating materials are required to have high thermal conductivity, toughness and withstand voltage, and a technique for improving properties of insulating materials by blending organic and/or inorganic filler is searched for, as for example described in Patent Document 6. An addition of organic and/or inorganic fillers to a varnish causes an increase in melt viscosity. A lowering in moldability hampers formation of a fine and complicated insulation structure, and, therefore, promotes the generation of voids between wirings. Furthermore, the lowering in moldability makes difficult the process of deaerating the resin composition, and, therefore, promotes the remaining of bubbles in the insulating layer. The voids between wirings and the bubbles in the insulating layer damage the insulation reliability of electronic/electric apparatuses, and should therefore be avoided. Especially, in the case of casting varnishes for manufacturing insulating layers, anchoring layers, housings and the like by impregnation and/or casting process, enhanced heat resistance and lowered viscosity are requested.

Patent Document 7 discloses a cured resin product obtained by molding an alumina ceramic with a thermosetting resin composition containing a polyfunctional epoxy resin which has two or more epoxy groups in one molecule thereof, an acid anhydride curing agent, an inorganic filler, and a surfactant. The cured resin product has a safety factor of stress of not less than 7, a safety factor of strain of not less than 10 and an acceptable defect size of not less than 0.1 mm when cooled to room temperature, and has a thermal conductivity of 0.7 to 2.5 W/m·K.

Patent Document 8 discloses a liquid thermosetting resin composition containing (a) an imide ring-containing epoxy compound which is obtained by preliminarily putting an epoxy resin containing at least two epoxy groups in one molecule thereof and having an average molecular weight of not more than 1,000, a phenoxy resin, and a polymaleimide compound having at least two maleimide groups in one molecule thereof into reaction, (b) a polyfunctional vinyl monomer which has two or more acrylic groups, methacrylic groups or allyl groups in one molecule thereof, and (c) a liquid acid anhydride. In the document, however, there is no discussion in regard of lowering of viscosity of the epoxy resin composition or an improvement in crack resistance of the composition.

PRIOR ART DOCUMENTS

Patent Documents

Patent Document 1: JP-1994-233486-A
Patent Document 2: JP-1997-316167-A
Patent Document 3: JP-1996-109316-A
Patent Document 4: JP-2010-193673-A
Patent Document 5: JP-1998-505376-A
Patent Document 6: JP-2011-01424-A
Patent Document 7: JP-2011-57734-A
Patent Document 8: JP-2004-203955-A

SUMMARY OF THE INVENTION

Problem to be Solved by the Invention

It is an object of the present invention to obtain a cured product excellent in heat resistance while lowering varnish viscosity, and to provide an electronic/electric apparatus using the cured product as an insulating material or/and a structural material.

It is another object of the present invention to obtain a cured product improved in thermal conductivity, thermal expansion properties, toughness and strength properties and being excellent in heat resistance and crack resistance, and to provide an electronic/electric apparatus using the cured product as an insulating material or/and a structural material.

It is a further object of the present invention to obtain a cured product improved in thermal conductivity, thermal expansion properties and toughness while lowering varnish viscosity and having excellent heat resistance, and to provide an electronic/electric apparatus using the cured product as an insulating material or/and a structural material.

It is yet another object of the present invention to obtain a cured product improved in thermal conductivity, thermal expansion properties and strength while lowering varnish viscosity and having excellent heat resistance, and to provide an electronic/electric apparatus using the cured product as an insulating material or/and a structural material.

It is a still further object of the present invention to obtain a cured product improved in thermal conductivity and thermal expansion properties while lowering varnish viscosity and having excellent heat resistance, and to provide an electronic/electric apparatus using the cured product as an insulating material or/and a structural material.

Means for Solving the Problem (I) The present invention is concerned with a resin composition in which varnish viscosity is lowered by blending a polyfunctional vinyl monomer into the varnish, the resin composition being able to form a cured product which is a copolymer of the polyfunctional vinyl monomer, an epoxy resin and an acid anhydride. When the resin composition is cured, the cured product shows enhanced heat resistance.

(II) In the present invention, besides, the resin composition of the above paragraph (I) further contains crushed crystalline silica, an acicular inorganic filler, crosslinked rubber particles and core-shell rubber particles added thereto in predetermined amounts. By the addition of these components, the cured product of the resin composition is improved in thermal conductivity, thermal expansion properties, toughness and strength, and is enhanced in crack resistance.

(III) In the present invention, further, the resin composition of the above paragraph (I) further contains crushed crystalline silica, crosslinked rubber particles and core-shell rubber particles added thereto in predetermined amounts. The addition of these components improves the thermal conductivity, thermal expansion properties and toughness of the cured product of the resin composition.

(IV) In the present invention, besides, the resin composition of the above paragraph (I) further contains crushed crystalline silica and an acicular inorganic filler added thereto in predetermined amounts. Owing to the addition of these components, the cured product of the resin composition shows improved thermal conductivity, thermal expansion properties and strength.

(V) In the present invention, further, the resin composition of the above paragraph (I) further contains crushed crystalline silica added thereto in a predetermined amount. The addition of this component improves the thermal conductivity and thermal expansion properties of the cured product of the resin composition.

Effects of the Invention

In accordance with the present invention, varnish viscosity can be lowered as compared with varnishes according to the related art, and the cured product of the varnish can be enhanced in heat resistance. Further, a cured product formed upon curing of the thermosetting resin composition and an electronic/electric apparatus using the cured product as an insulating material or/and a structural material can be provided.

In addition, according to the present invention, it is possible to lower varnish viscosity as compared with varnishes according to the related art, to improve the thermal conductivity, thermal expansion properties, toughness and strength of the cured product of the varnish, and to enhance the heat resistance and crack resistance of the cured product. Furthermore, it is possible to provide the cured product formed upon curing of the thermosetting resin composition, and an electronic/electric apparatus using the cured product as an insulating material or/and a structural material.

Besides, according to the present invention, varnish viscosity can be lowered as compared with varnishes according to the related art, and the cured product of the varnish can be improved in thermal conductivity, thermal expansion properties and toughness and being enhanced in heat resistance. Further, it is possible to provide the cured product formed upon curing of the thermosetting resin composition, and an electronic/electric apparatus using the cured product as an insulating material or/and a structural material.

In addition, according to the present invention, it is possible to lower varnish viscosity as compared with varnishes according to the related art, to improve the thermal conductivity, thermal expansion properties and strength of the cured product of the varnish, and to enhance the thermal resistance of the cured product. Furthermore, the cured product formed upon curing of the thermosetting resin composition and an electronic/electric apparatus using the cured product as an insulating material or/and a structural material can be provided.

Besides, according to the present invention, varnish viscosity can be lowered as compared with varnishes according to the related art, to improve the thermal conductivity and thermal expansion properties of the cured product of the varnish, and to enhance the heat resistance of the cured product. Further, it is possible to provide the cured product formed upon curing of the thermosetting resin composition, and an electronic/electric apparatus using the cured product as an insulating material or/and a structural material.

MODES FOR CARRYING OUT THE INVENTION

Figure 1:
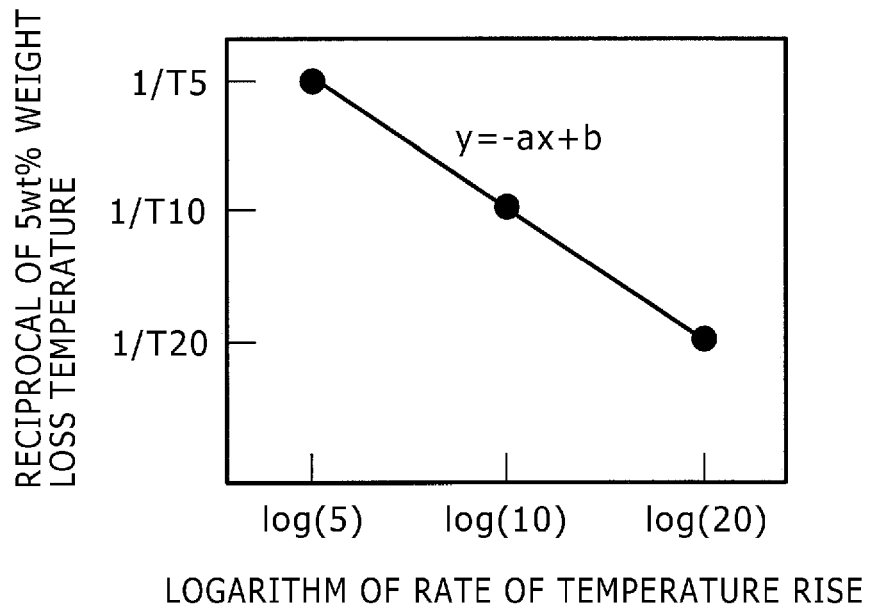
FIG. 1 is a graph showing the relationship between the reciprocal of 5% weight loss temperature and the logarithm of rate of temperature rise, in thermogravimetry of a cured product of an epoxy-vinyl copolymerization type resin composition according to the present invention.

Heretofore, lowing of viscosity of a varnish has been performed generally by a method in which a diluent is applied, as described in Patent Documents 1 and 2. In the related art, it has been considered that the amount of the diluent used should be kept small because diluent addition would lower the heat resistance of a cured product.

(I) However, the present inventor has found out that even in the case where a considerable amount of a polyfunctional vinyl monomer is adopted as a diluent, the heat resistance of a cured product can be enhanced by forming a copolymer comprised of an acid anhydride, an epoxy resin and a polyfunctional monomer.

Here, a copolymer means a polymer obtained through a process in which a plurality of kinds of monomers or prepolymers are bonded by a polymerization reaction. Therefore, the copolymer comprised of an acid anhydride, an epoxy resin and a polyfunctional vinyl monomer as above is a polymer obtained by bonding the acid anhydride, the epoxy resin and the polyfunctional vinyl monomer by a polymerization reaction. Accordingly, there may be cases where comparatively tiny amounts (desirably not more than 5% by weight based on the total amount of the plurality of monomers or prepolymers constituting the resin composition) of other monomers or prepolymers may unavoidably take part in the polymerization reaction, resulting in that the other monomers are among the components of the polymer obtained. Essentially, however, the polymer obtained is composed of structural units derived from the plurality of monomers or prepolymers mentioned above.

(II) Further, the present inventor has found out the following. In the case of copolymerization of an epoxy resin, an acid anhydride and a polyfunctional vinyl monomer, there is a tendency toward a lowering in crack resistance under influences of a rise in elastic modulus attendant on an increase in crosslink density, shrinkage on curing, etc. Notwithstanding this tendency, it is possible, by blending a predetermined amount of composite fine particles including crushed crystalline silica, an acicular inorganic filler and rubber particles having sizes in specified ranges into the resin composition, to improve the thermal conductivity, thermal expansion properties, toughness and strength of the cured product of the resin composition and to impart excellent heat resistance and crack resistance to the cured product.

(III) Furthermore, the present inventor has found out that it is possible, by blending a predetermined amount of composite fine particles including crushed crystalline silica and rubber particles having sizes in specified ranges into the resin composition, to improve the thermal conductivity, thermal expansion properties and toughness of the cured product of the resin composition and to impart excellent heat resistance to the cured product.

(IV) Further, the present inventor has found out that it is possible, by blending a predetermined amount of composite fine particles including crushed crystalline silica and an acicular inorganic filler having sizes in specified ranges into the resin composition, to improve the thermal conductivity, thermal expansion properties and strength of the cured product of the resin composition and to impart excellent heat resistance to the cured product.

(V) Furthermore, the present inventor has found out that it is possible, by blending a predetermined amount of crushed crystalline silica having a size in a specified range into the resin composition, to improve the thermal conductivity and thermal expansion properties of the cured product of the resin composition and to impart excellent heat resistance to the cured product.

Hereafter, the thermosetting liquid resin composition according to the present invention will be referred to as an epoxy-vinyl copolymerization type liquid resin composition, and the cured product thereof as an epoxy-vinyl copolymerization type insulating material.

At present, it is presumed that the heat resistance improving mechanism lies in the increase in crosslink density by copolymerization and the attendant lowering in the rate of thermal decomposition reaction, and that the crack resistance improving mechanism resides in stress relaxation and stress dispersion by the rubber particles.

Embodiments of the present invention may be exemplified as follows.

(1) An epoxy-vinyl copolymerization type liquid resin composition (I) containing: an epoxy resin having an epoxy resin equivalent (epoxy equivalent) of not more than 200 g/eq that is liquid at normal temperature (25° C., here and hereafter); (A) an acid anhydride having an unsaturated double bond that is liquid at normal temperature, or (B) the acid anhydride having an unsaturated double bond that is liquid at normal temperature and maleic anhydride; a polyfunctional vinyl monomer which is liquid at normal temperature; an epoxy resin curing catalyst which accelerates a curing reaction of the epoxy resin with (A) the acid anhydride or with (B) the acid anhydride and maleic anhydride; and a radical polymerization catalyst which accelerates a curing reaction of the polyfunctional vinyl monomer, characterized in that the resin composition is capable of forming, through curing, a cured product which is a copolymer of the epoxy resin, the acid anhydride or the acid anhydride and maleic anhydride, and the polyfunctional vinyl monomer.

This composition, by forming a copolymer composed of the epoxy resin and the acid anhydride (the above-mentioned (A) or (B)) and the polyfunctional vinyl monomer, can realize a higher heat resistance as compared with acid anhydride curing type epoxy resin compositions according to the related art.

The acid anhydride having an unsaturated double bond and the epoxy resin and the polyfunctional vinyl monomer are chemically bonded to one another, thereby forming a copolymer composed of the epoxy resin and the acid anhydride and the polyfunctional vinyl monomer. The epoxy resin and the polyfunctional vinyl monomer are desirably those which are not modified products obtained through chemical reaction with other compounds (namely, they are desirably an unmodified epoxy resin and an unmodified vinyl monomer), in order to avoid an increase in molecular weight (an increase in the viscosity of the composition).

It is to be noted that although maleic anhydride is solid at normal temperature, it becomes liquid upon dissolution in other component or components, and, therefore, it is used in the present invention. In the present invention, it is important that the resin composition capable of forming a cured product which is a copolymer composed at least of the epoxy resin, (A) the acid anhydride or (B) the acid anhydride and maleic anhydride, and the polyfunctional vinyl monomer be so conditioned as to be liquid at 17° C.; this characteristic property makes the resin composition excellent in handleability.

(2) The above-mentioned epoxy-vinyl copolymerization type liquid resin composition (II), characterized in that the resin composition further contains fine particles of one or more of the following (a) to (d): (a) crushed crystalline silica having an average particle diameter of 5 to 50 μm; (b) an acicular inorganic filler having an average diameter of 0.1 to 3 μm and an average length of 10 to 50 μm; (c) crosslinked rubber particles having an average particle diameter of 10 to 100 nm; and (d) core-shell rubber particles having an average particle diameter of 100 to 2,000 nm.

The crushed crystalline silica can impart high thermal conductivity and low-thermal-expansion properties, while the acicular filler can impart high strength, and the rubber particles can impart high toughness. The effects of the composite fine particles make it possible to obtain an epoxy-vinyl copolymerization type insulating material in which suppression of shrinkage on curing, a lowering in residual stress, suppression of growth of cracks by dispersion of stress at leading ends of fine cracks, control of coefficient of thermal expansion, enhancement of thermal conductivity, and a lowering in cost are effectively realized and which is excellent in crack resistance.

(3) The above-mentioned epoxy-vinyl copolymerization type liquid resin composition (III), characterized in that the resin composition further contains composite fine particles which include: (a) crushed crystalline silica having an average particle diameter of 5 to 50 μm; (b) crosslinked rubber particles having an average particle diameter of 10 to 100 nm; and (c) core-shell rubber particles having an average particle diameter of 100 to 2,000 nm. This makes it possible to obtain an epoxy-vinyl copolymerization type insulating material improved in thermal conductivity, thermal expansion properties and toughness and having excellent heat resistance.

(4) The above-mentioned epoxy-vinyl copolymerization type liquid resin composition (IV), characterized in that the resin further contains composite fine particles which include: (a) crushed crystalline silica having an average particle diameter of 5 to 50 μm; and (b) an acicular inorganic filler having an average diameter of 0.1 to 3 μm and an average length of 10 to 50 μm. This makes it possible to obtain an epoxy-vinyl copolymerization type insulating material improved in thermal conductivity, thermal expansion properties and strength and having excellent heat resistance.

(5) The above-mentioned epoxy-vinyl copolymerization type liquid resin composition (V), characterized in that the resin composition further contains composite fine particles which include (a) crushed crystalline silica having an average particle diameter of 5 to 50 μm. This makes it possible to obtain an epoxy-vinyl polymerization type insulating material improved in thermal conductivity and thermal expansion properties and having excellent heat resistance.

(6) The above-mentioned epoxy-vinyl copolymerization type liquid resin composition, characterized in that the composite fine particles contain: (a) 83 to 94% by weight of the crushed crystalline silica; (b) 1 to 5% by weight of the acicular inorganic filler; (c) 1 to 5% by weight of the crosslinked rubber particles; and (d) 2 to 9% by weight of the core-shell rubber particles, based on the total amount of the composite fine particles. The composite fine particles are contained in the resin composition in an amount of 50 to 76% by weight based on the total amount of the resin composition. The varnish as a matrix including the epoxy resin, the acid anhydride or maleic anhydride, and the polyfunctional vinyl monomer according to the present invention is low in viscosity as compared with epoxy resin compositions according to the related art. Therefore, even in the case of the varnish containing the composite fine particles according to the present invention, a rise in viscosity is suppressed, so that a deaerating operation and a casting operation can be carried out efficiently.

These fine particles may be in contact with one another or aggregated. It is desirable, however, that the fine particles are uniformly dispersed in such an extent that nonuniformity of varnish viscosity would not appear in the same varnish. This makes it possible to enhance casting operability and uniformity of physical properties of the cured product.

(7) The above-mentioned epoxy-vinyl copolymerization type liquid resin composition, characterized by further containing an epoxy resin curing catalyst which accelerates a curing reaction of the epoxy resin with (A) the acid anhydride having an unsaturated double bond that is liquid at normal temperature or (B) the acid anhydride having an unsaturated double bond that is liquid at normal temperature and maleic anhydride, and a radical polymerization catalyst which accelerates a curing reaction of the polyfunctional vinyl monomer. This accelerates both the curing reactions, whereby a cured product can be obtained in temperature and time ranges that are acceptable on a practical basis. In addition, it is possible to control curing time and curing temperature.

(8) The above-mentioned epoxy-vinyl copolymerization type liquid resin composition, characterized by containing a bisphenol A type epoxy resin or/and a bisphenol F type epoxy resin having an epoxy equivalent of not more than 200 g/eq, as the epoxy resin.

(9) The above-mentioned epoxy-vinyl copolymerization type liquid resin composition, characterized by containing methyltetrahydrophthalic anhydride or/and methylnadic anhydride, as the acid anhydride having an unsaturated double bond.

(10) The above-mentioned epoxy-vinyl copolymerization type liquid resin composition, characterized further in that the resin composition contains maleic anhydride in an amount of from 1 to 33 mol % or less based on the total amount of: (A) the acid anhydride; and (B) the acid anhydride and maleic anhydride. The radical polymerizability of maleic anhydride is high, and it is easy to form a copolymer of the epoxy resin, the acid anhydrides and the polyfunctional vinyl monomer. It is to be noted that the expression "1 to 33 mol %" herein means not less than 1 mol % and not more than 33 mol %.

(11) The epoxy-vinyl copolymerization type liquid resin composition, characterized in that the ratio of the number of equivalents of (A) the acid anhydride or of (B) the acid anhydride and maleic anhydride to the number of equivalents of the epoxy resin in Equation 1 set forth below is not less than 0.9 and less than 1.0, and the resin composition contains the polyfunctional vinyl monomer in an amount of 10 to 100 parts by weight based on 100 parts by weight in total of the epoxy resin and (A) the acid anhydride or (B) the acid anhydride and maleic anhydride, contains the epoxy resin curing catalyst in an amount of 0.08 to 1.0 part by weight based on 100 parts by weight of the epoxy resin, and contains the radical polymerization catalyst in an amount of 0.5 to 2 parts by weight based on 100 parts by weight of the polyfunctional vinyl monomer.

$$\text{Equivalent ratio} = \text{(the total number of equivalents of all acid anhydrides in the resin composition)} \div \text{(the total number of equivalents of all epoxy resins in the resin composition)} \quad \text{Equation 1}$$

(where the total number of equivalents of all acid anhydrides is a value obtained by dividing the amounts of all acid anhydrides in the resin composition by equivalents of the acids and summing up the quotients, and the total number of equivalents of all epoxy resins is a value obtained by dividing the amounts of all epoxy resins in the resin composition by the equivalents of the epoxy resins and summing up the quotients)

This configuration makes it possible to obtain an insulating varnish capable of restraining unreacted epoxy resin and acid anhydrides from remaining.

(12) The epoxy-vinyl copolymerization type liquid resin composition, characterized in that the resin composition further contains an inorganic filler or/and organic filler other than (a) the crushed crystalline silica, (b) the acicular inorganic filler, (c) the crosslinked rubber particles and (d) the core-shell rubber particles. The addition of the inorganic filler or/and organic filler makes it possible to control the coefficient of thermal expansion, strength and crack resistance of the cured product.

(13) The epoxy-vinyl copolymerization type liquid resin composition, characterized in that gelation time at 100° C. is not less than one hour. Adoption of the configuration of this composition makes it possible to secure workability at the time of molding and/or casting process.

(14) An epoxy-vinyl copolymerization type cured product which is a cured product formed by curing a resin composition, the resin composition containing: an epoxy resin having an epoxy resin equivalent of not more than 200 g/eq; an acid anhydride having an unsaturated double bond that is liquid at normal temperature or the acid anhydride having an unsaturated double bond that is liquid at normal temperature and maleic anhydride; a polyfunctional vinyl monomer which is liquid at normal temperature; an epoxy resin curing catalyst which accelerates a curing reaction of the epoxy resin with the acid anhydride or with the acid anhydride and maleic anhydride; and a radical polymerization catalyst which accelerates a curing reaction of the polyfunctional vinyl monomer, characterized in that the cured product is a copolymer of the epoxy resin, the acid anhydride or the acid anhydride and maleic anhydride, and the polyfunctional vinyl monomer.

(15) The above-mentioned epoxy-vinyl copolymerization type cured product, characterized in that the cured product further contains composite fine particles which include: (a) crushed crystalline silica having an average particle diameter of 5 to 50 µm; (b) an acicular inorganic filler having an average diameter of 0.1 to 3 µm and an average length of 10 to 50 µm; (c) crosslinked rubber particles having an average particle diameter of 10 to 100 nm; and (d) core-shell rubber particles having an average particle diameter of 100 to 2,000 nm.

(16) The above-mentioned epoxy-vinyl copolymerization type cured product, characterized in that the cured product further contains composite fine particles which include: (a) crushed crystalline silica having an average particle diameter of 5 to 50 µm; (c) crosslinked rubber particles having an average particle diameter of 10 to 100 nm; and (d) core-shell rubber particles having an average particle diameter of 100 to 2,000 nm.

(17) The above-mentioned epoxy-vinyl copolymerization type cured product, characterized in that the cured product further contains composite fine particles which include: (a) crushed crystalline silica having an average particle diameter of 5 to 50 µm; and (b) an acicular inorganic filler having an average diameter of 0.1 to 3 µm and an average length of 10 to 50 µm.

(18) The above-mentioned epoxy-vinyl copolymerization type cured product, characterized in that the cured product further contains composite fine particles which include (a) crushed crystalline silica having an average particle diameter of 5 to 50 µm.

(19) An epoxy-vinyl copolymerization type insulating material characterized in that an activation energy based on a temperature for weight loss of 5 wt % against total amount of organic components of the above-mentioned cured product is not less than 30 kcal/mol. This makes it possible to provide an insulating material having excellent heat resistance.

(20) An electronic or electric apparatus characterized in that the above-mentioned epoxy-vinyl copolymerization type cured product is used as an insulator or/and a structural material.

(21) A method of producing an epoxy-vinyl copolymerization type cured product, the method including:

preparing a resin composition, the resin composition including an epoxy resin having an epoxy equivalent of not more than 200 g/eq, (A) an acid anhydride having an unsaturated double bond that is liquid at normal temperature or (B) the acid anhydride having an unsaturated double bond that is liquid at normal temperature and maleic anhydride, a polyfunctional vinyl monomer which is liquid at normal temperature, an epoxy resin curing catalyst which accelerates a curing reaction of the epoxy resin with the acid anhydride or with the acid anhydride and maleic anhydride, and a radical polymerization catalyst which accelerates a curing reaction of the polyfunctional vinyl monomer; and heating the resin composition so as to form a copolymer of the epoxy resin, the acid anhydride or the acid anhydride and maleic anhydride, and the polyfunctional vinyl monomer.

The use of the production method enables an acid anhydride curing type epoxy resin composition to be enhanced in heat resistance, without use of any polyfunctional epoxy resin or acid anhydride that has a special structure and requires intricate process to synthesize or purify. In addition, in a resin system wherein a liquid epoxy resin, an acid anhydride having an unsaturated double bond, and a polyfunctional vinyl monomer which are for general purpose are used as main components, enhancement of heat resistance of the cured product of the insulating varnish can be realized without causing an increase in viscosity of the insulating varnish. Consequently, this configuration successfully contributes to improvement of workability.

(22) The above-mentioned method of producing an epoxy-vinyl copolymerization type cured product, characterized in that the cured resin product further contains composite fine particles which include: (a) crushed crystalline silica having an average particle diameter of 5 to 50 µm; (b) an acicular inorganic filler having an average diameter of 0.1 to 3 µm and an average length of 10 to 50 µm; (c) crosslinked rubber particles having an average particle diameter of 10 to 100 nm; and (d) core-shell rubber particles having an average particle diameter of 100 to 2,000 nm.

(23) The above-mentioned method of producing an epoxy-vinyl copolymerization type cured product, characterized in that the cured product further contains composite fine particles which include: (a) crushed crystalline silica having an average particle diameter of 5 to 50 µm; (c) crosslinked rubber particles having an average particle diameter of 10 to 100 nm; and (d) core-shell rubber particles having an average particle diameter of 100 to 2,000 nm.

(24) The above-mentioned method of producing an epoxy-vinyl copolymerization type cured product, characterized in that the cured product further contains composite fine particles which include: (a) crushed crystalline silica having an average particle diameter of 5 to 50 µm; and (b) an acicular inorganic filler having an average diameter of 0.1 to 3 µm and an average length of 10 to 50 µm.

(25) The above-mentioned method of producing an epoxy-vinyl copolymerization type cured product, characterized in that the cured product further contains composite fine particles which include (a) crushed crystalline silica having an average particle diameter of 5 to 50 µm.

A comparison between the subject matter of the invention described in the above-mentioned Patent Document (hereinafter referred to as Document 8) and the present invention will be described as follows.

(1) In Document 8, an imide ring-containing epoxy resin obtained by reaction of an epoxy resin with a polymaleimide is used as an indispensable component for enhancement of heat resistance. The imide ring-containing epoxy resin has a problem of an increased molecular weight as compared with the epoxy resin and the polymaleimide used as the starting materials. While the imide ring-containing epoxy resin is dissolved in the liquid polyfunctional vinyl monomer and acid anhydride to obtain a liquid varnish, there arises a problem of an increased varnish viscosity corresponding to the increased molecular weight. Besides, if modification with the polymaleimide progresses excessively in the step of synthesizing the imide ring-containing epoxy resin, the epoxy resin would be crosslinked, so that it may be impossible to obtain a varnish. Accordingly, an appropriate process control would be needed, and the varnish production process would become intricate.

On the other hand, the present invention is based on a design thought wherein an epoxy resin, a polyfunctional vinyl monomer and an acid anhydride having an unsaturated double bond which are unmodified are used, and they are copolymerized during the curing process thereof, whereby the cured product is provided with an increased crosslink density and enhanced heat resistance. According to the present invention, a modification such as to cause an increase in molecular weight is not applied to the epoxy resin, polyfunctional vinyl monomer and acid anhydride which are for general purpose, at the stage of varnish. Therefore, the present invention is advantageous from the viewpoints of a lowered varnish viscosity and an easier varnish production process control.

Furthermore, the present invention is based on the finding of a formulation of composite fine particles characterized by containing crushed crystalline silica having an average particle diameter of 5 to 50 µm, an acicular inorganic filler having an average diameter of 0.1 to 3 µm and an average length of 10 to 50 µm, crosslinked rubber particles having a particle diameter of 10 to 100 nm, and core-shell rubber particles having a particle diameter of 100 to 2,000 nm, as against curing shrinkage attendant on an increase in crosslink density and against lowering in crack resistance due to an increase in residual stress. The present invention, based on the finding, has provided a cured product with improved properties such as enhanced thermal conductivity, lowered thermal expansion, enhanced toughness, enhanced strength and lowered price, and with remarkably enhanced crack resistance, in addition to good heat resistance.

(2) In comparison regarding reaction mechanism, in the case of Document 8 there are considered two patterns, namely, (aa) a case where the imide-containing epoxy resin contains the maleimide group and (bb) a case where the maleimide group has disappeared and only the epoxy group is contained in the resin. It is to be noted here that the resin becomes insoluble due to crosslinking in the case (bb); therefore, only the case (aa) is worth consideration, wherein there occurs copolymerization between the epoxy resin and the polyfunctional vinyl monomer through the maleimide group. Here, even in the case where the acid anhydride has a double bond, it is considered that the high radical polymerizability of the maleimide group causes the reaction of the acid anhydride with the maleimide group to progress with priority, whereas the reaction between the unsaturated double bond of the acid anhydride and the polyfunctional vinyl monomer does not proceed sufficiently, during the curing. Thus, in the case of Document 8, there is adopted a thought that an epoxy resin is modified to be polyfunctional, thereby causing an increase in crosslink density.

In the present invention, on the other hand, in the process of the curing reaction between the epoxy resin and the acid anhydride having an unsaturated double bond, the crosslinking reaction between the acid anhydride having an unsaturated double bond and the functional vinyl monomer is let progress simultaneously, whereby the curing system is increased in crosslink density and enhanced in heat resistance. Thus, the present invention is an invention adapted to realize a lowering in viscosity in a varnish state and an enhancement of heat resistance of a cured product, by the design thought wherein a curing reaction of an epoxy resin and modification of an acid anhydride having an unsaturated double bond are carried out simultaneously.

Now, the components of the epoxy-vinyl copolymerization type resin composition according to the present invention will be described below.

(i) Epoxy Resin:

The epoxy resin is preferably a bisphenol A type or bisphenol F type epoxy resin. A polyfunctional epoxy resin with a functionality of at least three or an epoxy resin with a stiff structure may be used. In this case, however, the heat resistance improving effect is lowered and, in addition, varnish viscosity is increased. Epoxy resins having an epoxy equivalent of not more than 200 g/eq are more preferable, from the viewpoint of lowering of varnish viscosity.

Specific examples of the preferable epoxy resin include: EPICLON 840 (epoxy equivalent: 180 to 190 g/eq, viscosity: 9,000 to 11,000 mPa·s/25° C.), EPICLON 850 (epoxy equivalent: 183 to 193 g/eq, viscosity: 11,000 to 15,000 mPa·s/25° C.), and EPICLON 830 (epoxy equivalent: 165 to 177 g/eq, viscosity: 3,000 to 4,000 mPa·s/25° C.), all produced by DIC Corporation; jER 827 (epoxy equivalent: 180 to 190 g/eq, viscosity: 9,000 to 11,000 mPa·s/25° C.), jER 828 (epoxy equivalent: 184 to 194 g/eq, viscosity: 12,000 to 15,000 mPa·s/25° C.) and jER 806 (epoxy equivalent: 160 to 170 g/eq, viscosity: 15,000 to 25,000 mPa·s/25° C.), all produced by Mitsubishi Chemical Corporation; and EPICLON 830 (epoxy equivalent: 165 to 177 g/eq, viscosity: 3,000 to 4,000 mPa·s/25° C.).

From the viewpoint of heat resistance, a bisphenol A type epoxy resin is preferably used. From the viewpoint of lowering of viscosity, a bisphenol F type epoxy resin is preferably used. Besides, a blend of both of these types of epoxy resin may be used for attaining balanced properties.

(ii) Acid Anhydride(s):

A general-purpose liquid acid anhydride having an unsaturated double bond in its structure is preferably used. The use of the acid anhydride having an unsaturated double bond causes copolymerization with the polyfunctional vinyl monomer in the curing process. It is considered that there occurs copolymerization between the polyfunctional vinyl monomer and the epoxy resin through the acid anhydride, resulting in that the cured product shows enhanced heat resistance. Examples of such acid anhydride include: HN-2000 (acid anhydride equivalent: 166 g/eq, viscosity: 30 to 50 mPa·s/25° C.), HN-2200 (acid anhydride equivalent: 166 g/eq, viscosity: 50 to 80 mPa·s/25° C.), and MHAC-P (acid anhydride equivalent: 178 g/eq, viscosity: 150 to 300 mPa·s/25° C.), all produced by Hitachi Chemical Co., Ltd.; and EPICLON B-570H (acid anhydride equivalent: 166 g/eq, viscosity: 40 mPa·s/25° C.) produced by DIC Corporation.

The acid anhydrides may be used either singly or as a mixture thereof. Furthermore, maleic anhydride may be used in an amount of 1 to 33 mol % based on the total amount of acid anhydrides in the system. Although maleic anhydride is solid at normal temperature, its amount in this range permits the maleic anhydride to be dissolved in the liquid acid anhydride and the polyfunctional vinyl monomer, so that the maleic anhydride can be handled in the same manner as the liquid acid anhydride. Since maleic anhydride is high in the property for copolymerization with the polyfunctional vinyl monomer, the maleic anhydride is preferable for use as a component of the epoxy-vinyl copolymerization type insulating material.

(iii) Polyfunctional Vinyl Monomer:

Compounds having a plurality of unsaturated double bonds such as acrylate groups, methacrylate groups, styrene groups, allyl groups, etc. in the molecule thereof can be used. Among these compounds, those compounds which are liquid at normal temperature are preferably applied. Examples of such compounds include: hexanediol diacrylate (Miramer M200, viscosity: 15 mPa·s/25° C.), EO-modified hexanediol diacrylate (Miramer M202, viscosity: 30 mPa·s/25° C.), tripropylene glycol diacrylate (Miramer M220, viscosity: 20 mPa·s/25° C.), trimethylolpropane triacrylate (Miramer M300, viscosity: 120 mPa·s/25° C.), EO-modified trimethylolpropane triacrylate (Miramer M3130, viscosity: 65 mPa·s/25° C.), ditrimethylolpropane tetraacrylate (Miramer M410, viscosity: 750 mPa·s/25° C.), diethyleneglycol dimethacrylate (Miramer M231, viscosity: 20 mPa·s/25° C.), trimethylolpropane trimethacrylate (Miramer M301, viscosity: 60 mPa·s/25° C.), all produced by Toyo Chemicals Co., Ltd.; triallyl isocyanate (viscosity: 80 to 110 mPa·s/30° C.), 1,2-bis(m-vinylphenyl)ethane, and 1-(p-vinylphenyl)-2-(m-vinylphenyl)ethane, all produced by Wako Pure Chemical Industries, Ltd. These polyfunctional vinyl monomers are preferably used in an amount ranging from 10 to 100 parts by weight, based on 100 parts by weight of the total amount of the epoxy resin and the acid anhydride(s).

If the amount of the polyfunctional vinyl monomer blended is less than 10 parts by weight, the heat resistant improving effect would be lowered. If the amount exceeds 100 parts by weight, cracking attendant on curing shrinkage would easily occur in the insulating material. The use of maleic anhydride and the polyfunctional vinyl monomer in a total amount of 30 to 100 parts by weight, based on 100 parts by weight of the epoxy resin, is further preferable from the viewpoint of improvement of crack resistance.

(iv) Epoxy Resin Curing Catalyst:

The epoxy-vinyl copolymerization type liquid resin composition according to the present invention contains an epoxy resin curing catalyst which accelerates the curing reaction between the epoxy resin and the acid anhydride and a radical polymerization catalyst which accelerates the curing reaction of the polyfunctional vinyl monomer.

Examples of the epoxy resin curing catalyst include: tertiary amines such as trimethylamine, triethylamine, tetramethylbutanediamine, triethylenediamine, etc.; amines such as dimethylaminoethanol, dimethylaminopentanol, tris (dimethylaminomethyl)phenol, N-methylmorpholine, etc.; quaternary ammonium salts such as cethyltrimethylammonium bromide, cetyltrimethylammonium chloride, cetyltrimethylammnium iodide, dodecyltrimethylammonium bromide, dodecyltrimethylammonium chloride, dodecyltrimethylammonium iodide, benzyldimethyltetradecylammonium chloride, benzyldimethyltetradecylammonium bromide, allyldodecyltrimethylammonium bromide, benzyldimethylstearylammonium bromide, stearyltrimethylammonium chloride, benzyldimethyltetradecylammonium acetylate, etc.; imidazoles such as 2-methylimidazole, 2-ethylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-phenylimidazole, 1-cyanoethyl-2-methylimidazole, 1-azine-2-undecyl, etc.; metallic salts of an amine with zinc octanoate or cobalt or the like; 1,8-diaza-bicyclo(5,4,0)-undecene-7; N-methyl-piperazine; tetramethylbutylguanidine; aminetetraphenyl borates such as teriethylammonium tetraphenyl borate, 2-ethyl-4-methyltetraphenyl borate, 1,8-diaza-bicyclo(5,4,0)-undecene-7-tetraphenyl borate, etc.; triphenylphosphine; triphenylphosphonium tetraphenyl borate; aluminum trialkylacetoacetates; aluminum trisacetylacetoacetate, aluminum alcoholates; aluminum acylate; and sodium alcoholates. The addition amount of the epoxy resin curing catalyst is preferably in the range of 0.08 to 1.0 parts by weight based on 100 parts by weight of the epoxy resin. This range of addition amount makes it possible to control the gelation time at 100° C. and the glass transition temperature of the epoxy-vinyl copolymerization insulating material obtained as the cured product.

(v) Radical Polymerization Catalyst:

Examples of the radical polymerization catalyst include: benzoin compounds such as benzoin, benzoin methyl, etc.; acetophenone compounds such as acetophenone, 2,2-dimethoxy-2-phenylacetophenone, etc.; thioxanthone compounds such as thioxanthone, 2,4-diethylthioxanthone, etc.; bisazide compounds such as 4,4'-diazidochalcone, 2,6-bis (4'-azidobenzal)cyclohexanone, 4,4'-diazidobenzophenone, etc.; azo compounds such as azobisisobutyronitrile, 2,2-azobispropane, m,m'-azoxystyrene, hydrazine, etc.; and organic peroxides such as 2,5-dimethyl-2,5-di(t-butylperoxy)hexane, 2,5-dimethyl-2,5-di(t-butylperoxy)hexyne-3, dicumyl peroxide, etc.

Especially, for controlling the gelation at 100° C., it is preferable to use a radical polymerization catalyst having a one-hour half-life temperature at least exceeding 100° C. Examples of such a radical polymerization catalyst include t-butylperoxymaleic acid (one-hour half-life temperature: 119° C., PERBUTYL MA produced by NOF Corporation), n-butyl-4,4-bis(t-butylperoxy)valerate (one-hour half-life temperature: 126.5° C., PERHEXA V, produced by NOF Corporation), 2,5-dimethyl-2,5-di(t-butylperoxy)hexyne-3 (one-hour half-life temperature: 149.9° C., PERHEXYNE 25B, produced by NOF Corporation), and dicumyl peroxide (one-hour half-life temperature: 175.2° C., PERCUMYL D, produced by NOF Corporation). It is preferable to set the addition amount of such a radical polymerization catalyst to within the range of 0.5 to 2 parts by weight based on 100 parts by weight of the polyfunctional vinyl monomer, from the viewpoint of control of the gelation time.

(vi) Composite Fine Particle Components:

The epoxy-vinyl copolymerization type liquid resin composition according to the present invention contains one or more of (a) crushed crystalline silica having an average particle diameter of 5 to 50 µm, (b) an acicular inorganic filler having a diameter of 0.1 to 3 µm and a length of 10 to 50 µm, (c) crosslinked rubber particles having an average particle diameter of 10 to 100 nm, and (d) core-shell rubber particles having an average particle diameter of 100 to 2,000 nm.

(a) Crushed Crystalline Silica:

The crushed crystalline silica is preferable for use as a main component of the composite fine particles, in view of its high thermal conductivity, low-thermal-expansion properties, and low price. Its preferable average diameter is 5 to 50 µm. More preferably, the crushed crystalline silica has a wide particle diameter distribution of about 0.1 to 100 µm. As a result of this configuration, a rise in varnish viscosity can be suppressed even in the case where the resin composition is heavily loaded with the crushed crystalline silica. Examples of such silica include SQ-H22 and SQ-H18, both produced by Hayashi-Kasei Co., Ltd., and CRYSTALITE series produced by Tatsumori Ltd. It is to be noted here that the above-mentioned average particle diameters are the values disclosed by the makers. This applies also to the average diameter and average length of the acicular inorganic filler which will be described later, as well as the average particle diameters of the crosslinked rubber particles and the core-shell rubber particles which will be described later.

(b) Acicular Inorganic Filler:

The acicular inorganic filler not only contributes to suppression of curing shrinkage and enhancement of strength of the cured product, but also contributes to improvement of crack resistance through a composite action of it with the rubber particle components described later. As for the size of the acicular inorganic filler, the average diameter is preferably 0.1 to 3 µm, and the average length is preferably 10 to 50 µm, from the viewpoint of suppressing the rise in varnish viscosity. Examples of such acicular inorganic filler include ALBOREX Y (aluminum borate whisker, diameter: 0.1 to 1 µm, length: 10 to 30 µm) produced by Shikoku Chemicals Corporation, TISMO N (potassium titanate whisker, diameter: 0.3 to 0.6 µm, length 10 to 20 µm) produced by Otsuka Chemical Co., Ltd., MOS-HIGE (magnesium sulfate whisker, diameter: 0.10 µm, length 10 to 30 µm) produced by Ube Industries, Ltd., and WHISCAL A (calcium carbonate whisker, diameter: 0.10 to 1 µm, length 20 to 30 µm) produced by Maruo Calcium Co., Ltd. These acicular inorganic fillers may contain an acicular inorganic filler pulverized to short lengths upon stirring at the time of varnish preparation.

Crosslinked Rubber Particles or Core-Shell Rubber Particles:

The crosslinked rubber particles or the core-shell rubber particles impart flexibility and stress relaxation properties to the cured resin product, thereby contributing to improvement of crack resistance. In the present invention, crosslinked rubber particles having an average particle diameter of 10 to 100 nm and core-shell rubber particles having an average particle diameter of 100 to 2,000 nm are used jointly. Such rubber particle components are so configured that growth of fine cracks is restrained by the smaller-particle-diameter rubber particles, while the stress not relaxed by the smaller-particle-diameter rubber particles is suppressed by the larger-particle-diameter rubber particles, whereby development of cracks is suppressed to minimum. The crosslinked rubber particles with smaller particle diameter may solely be used in an increased addition amount so as to reduce the elastic modulus of the cured product, thereby restraining generation of cracks. In that case, however, a conspicuous rise in varnish viscosity would be brought about.

In the present invention, such rubber particles having different particle diameters are used jointly, whereby crack resistance is improved while restraining a conspicuous rise in varnish viscosity. It is preferable to use, as the larger-particle-diameter rubber particles, the core-shell rubber particles which have been improved in dispersibility in the epoxy resin.

Examples of components of the rubber particles include common synthetic rubbers such as acrylic rubber, nitrile rubber, urethane rubber, ethylene propylene rubber, styrene rubber, silicone rubbers, fluoro-rubber, etc. and their carboxylic acid-modified or acrylic acid-modified products. Those rubbers whose surfaces or inside has been modified with carboxyl group, acid anhydrides, amines or imidazoles, and the liker rubbers, are commonly available on a commercial basis.

(c) Crosslinked Rubber Particles:

Crosslinked acrylonitrile-butadiene rubber particles are particularly preferable, from the viewpoint of cost and heat resistance. As for the crosslinking method, those crosslinked rubber particles which have been crosslinked by radiations such as gamma rays are preferably used. Radiation crosslinking can offer rubber particles with higher heat resistance, as compared with chemical crosslinking based on the use of a crosslinking agent. In the case of radiation crosslinking, furthermore, generation of migration due to a crosslinking agent is restrained, which contributes to enhancement of reliability as to insulation.

(d) Core-Shell Rubber Particles:

The core-shell rubber particles have the above-mentioned crosslinked rubber particles as cores, and have on the core's surfaces a shell layer formed through graft polymerization of a different-kind polymer. This makes it possible to increase dispersibility of the rubber particles in resin. Commercially available examples of such core-shell rubber particles include PARALOID EXL2655 (product name) (average particle diameter: 200 nm) produced by Rohm & Haas Co., Ltd., as well as STAPHYLOID AC3355 (product name) (average particle diameter: 100 to 500 nm) and ZEFIAC F351 (product name) (average particle diameter: 300 nm) both produced by Gantz Chemical Co., Ltd.

As for the preferable compositional range of the composite fine particles, it is preferable to use 83 to 94% by weight of the crushed crystalline silica, 1 to 5% by weight of the acicular inorganic filler, 1 to 5% by weight of the crosslinked rubber particles, and 2 to 9% by weight of the core-shell rubber particles, based on the total amount of the composite fine particles, and to incorporate the composite fine particles in an amount of 50 to 70% by weight, based on the total amount of the resin composition, from the viewpoint of reduction of varnish viscosity and improvement of crack resistance. The base material including the epoxy resin, the liquid acid anhydride, and the polyfunctional vinyl monomer is low in varnish viscosity. In the varnish containing the composite fine particles within the just-mentioned range, therefore, a rise in varnish viscosity is restrained, and it is possible to enhance the efficiency of the casting operation.

The epoxy-vinyl copolymerization type liquid resin composition cures when heated, and the cured product can be used as an insulator or a structural body. The epoxy-vinyl copolymerization type insulating material, which is the cured product, is excellent in heat resistance and crack resistance, and can contribute to enhancement of insulation reliability of various electronic or electric apparatuses.

Among the epoxy-vinyl copolymerization type insulating materials, those in which an activation energy based on 5 wt % weight loss of organic components in the cured product is not less than 30 kcal/mol, preferably not less than 40 kcal/mol, are preferably used, in view of their high improving effect on the heat resistance of various apparatuses. As for the curing conditions for the varnish according to the present invention, the curing temperature is selected within the range of 100 to 180° C., and the curing time is selected within the range of 1 to 24 hours. Especially, curing by multistage heating is preferable, from the viewpoint of prevention of cracking attendant on curing shrinkage.

The activation energy based on 5 wt % weight loss in the present invention is one of the factors governing the heat resistance of the insulating material, and refers to the value determined by the following method. Thermogravimetric analysis (TGA) of the cured resin product is carried out in atmospheric air, at rates of temperature rise of 5° C./min, 10° C./min, and 20° C./min. Under each of the temperature rise conditions, the temperature (absolute temperature T5, T10, T20) at which the amount (weight) of the organic components in the cured resin product is reduced (lost) by 5 wt % is observed.

FIG. 1 is a graph showing the relationship between reciprocal of 5% weight loss temperature and logarithm of rate of temperature rise, in thermogravimetry of a cured product of the epoxy-vinyl copolymerization resin composition according to the present invention. As shown in FIG. 1, the graph plotted with the logarithm (log(5), log(10), log(20)) of the rate of temperature rise on the axis of abscissas and with the reciprocal of the 5% weight loss temperature observed (1/T5, 1/T10, 1/20T) on the axis of ordinates is approximated by a straight line. The absolute value "a" of the gradient of the straight line is substituted into the following Equation 2, to determine the activation energy based on 5 wt % weight loss.

$$\text{Activation energy (kcal/mol)} = 1/a \times R \div 0.4567 \div 1{,}000 \quad \text{Equation 2}$$

(R is the gas constant=1.987 cal/K·mol)

Now, the definitions and descriptions of the other terms used herein will be given below.

[1] Heat Resistant Temperature Index

In the present invention, the time when the weight loss ratio of organic components in an insulating material under a certain temperature environment reaches 5 wt % has been defined as life-time. In the present invention, besides, a target life-time has been defined as 30 years. The temperature at which a weight loss of 5 wt % is attained after 30 years has been defined as heat resistant index temperature. A heat resistant temperature index has been determined from a 5% weight loss temperature and an activation energy which have been empirically determined at 230° C. The contents of this process is described in "(6) Calculation of heat resistant temperature index" in Examples set forth below.

[2] Range of Acid Anhydride

The acid anhydride having an unsaturated double bond and being liquid at normal temperature that is concerned with the present invention is preferably an acid anhydride which has an unsaturated double bond in the structure thereof, is liquid at normal temperature and has an acid anhydride equivalent of 166 to 178 g/eq.

[3] Definition of Polyfunctional Vinyl Monomer

The polyfunctional vinyl monomer concerned with the present invention is a compound which has a plurality of unsaturated double bonds such as acrylate groups, methacrylate groups, styrene groups, allyl groups, etc. in its molecule, and is preferably a compound which is liquid at normal temperature and is lower in viscosity than the epoxy resin.

[4] Definition of Varnish (in General, Transparent Coating Material)

The varnish concerned with the present invention is a solventless varnish. As for substances contained in the varnish, the varnish contains the above-described epoxy resin, acid anhydride, polyfunctional vinyl monomer, epoxy resin curing catalyst, and radical polymerization catalyst as indispensable components. Furthermore, the varnish may contain organic or inorganic fillers as additives.

[5] Technical Meaning of Heat Resistance Enhancing Method

A heat resistance enhancing method in the present invention refers to a technology in which copolymerization of an epoxy resin, an acid anhydride and a polyfunctional vinyl monomer is conducted to obtain an increased crosslink density, as compared with cured products of an epoxy resin and an acid anhydride according to the related art, so as to slow down the rate of thermal decomposition reaction, thereby enhancing long-term reliability as to heat resistance. Especially, in the present invention, description is made of lowering in rate of thermogravimetric weight loss at high temperatures.

[6] Technology of Preliminarily Effecting Reaction of Epoxy Resin with Acid Anhydride, or Vinyl Monomer with Epoxy Resin The above-mentioned methods are out of the scope of the present invention. This is for obviating the situation in which a reaction product enhanced in molecular weight by a preliminary reaction leads to an increase in varnish viscosity. The acid anhydride-epoxy-vinyl copolymer in the present invention is formed during a heat curing process after casting or impregnation.

[7] Activation Energy

As shown in Comparative Examples 1 and 4 described later, there exist resins which are resins according to the related art and yet have an activation energy of not less than 30 kcal/mol. The present invention is characterized not only by the adoption of an activation energy of not less than 30 kcal/mol but also by the addition of a technology for enhancing heat resistance and/or crack resistance without causing an increase in the viscosity or cost of acid anhydride curing type epoxy resins according to the related art. The specification of "not less than 30 kcal/mol" indicates the value for insulating materials having a heat resistance corresponding to F type insulating materials, which constitute the main stream of the current groups of products. Thus, this specification is a minimum condition to be met at the time of application of products.

One of the objects of the present invention is to provide: a technique by which the heat resistance of a cured product of an acid anhydride curing type epoxy resin varnish according to the related art is enhanced while lowering the viscosity of the varnish; a thermosetting resin composition and a cured product thereof which are obtained by use of the technique; and an electronic/electric apparatus in which the cured product is used as an insulating material or/and a structural material. Another object of the present invention is to provide: a technique by which high heat resistance and high crack resistance are imparted to a cured product of an acid anhydride curing type epoxy resin varnish according to the related art while lowering the viscosity of the varnish; a thermosetting resin composition and a cured product thereof which are obtained by use of the technique; and an electronic/electric apparatus in which the cured product is used as an insulating material or/and a structural material. As has been mentioned above, the specification of "30 kcal/mol" is described as an index to be used at the time of application of products. Accordingly, Examples 1 and 2 where the activation energy is increased as compared with Comparative Examples where copolymerization with polyfunctional vinyl monomer is not conducted as described later are within the scope of the present invention, although the activation energy there has not reached 30 kcal/mol. Similarly, Comparative Examples 1, 4 and 5 where the activation energy has exceeded 30 kcal/mol are not included in the present invention.

[8] What is 0.4567 in Equation 2

The value of 0.4567 is the coefficient used in an approximate formula for deduction of activation energy by Ozawa method (source: Takeo Ozawa, "Non-isothermal Kinetics (1) Single Elementary Process", Netsu Sokutei Vol. 31, (3), pp 125-132).

[9] Heat Resistant Temperature Index

The present invention provides a technique in which an acid anhydride having an unsaturated double bond, an epoxy resin and a polyfunctional vinyl monomer are copolymerized so as to enhance heat resistance, and also provides a varnish, a cured product of the varnish and an apparatus which are obtained by use of the technique. Accordingly, like in the case of the activation energy mentioned above, the present invention is not to be restricted by the magnitude of the heat resistant temperature index. Also, like in the case of the activation energy, 155° C. is considered to be a minimum line, with the current products as criteria. In that case, the resin composition in Comparative Example 5 described later is also acceptable from the viewpoint of the magnitude of the heat resistant temperature index, but it can be said that the resin compositions of the present invention which contain a polyfunctional vinyl monomer lower in viscosity are higher in varnish viscosity-lowering effect than the resin composition of Comparative Example 5.

[10] Evaluation of Heat Resistance of Cured Product by Activation Energy

In the present invention, in view of the fact that material systems belong to the same system, the cured products are evaluated as to heat resistance by activation energy. The activation energy corresponds to the gradient of Arrehenium plots shown in FIG. 2. As the activation energy is higher, the gradient is greater, and a higher heat resistance is anticipated. However, in the case where the material system is quite different and where, for example, the life-time at 230° C. is extremely short, the heat resistant temperature index would be low even if the gradient is high. In Examples of the present invention, the life-time at 230° C. have been determined, and, therefore, the ranking of heat resistant temperature indices is considered to be reliable. In addition, the values of activation energy and heat resistant temperature index differ greatly, depending on whether the heat resistance to be obtained is strength or thermal weight loss. In the present invention, only the heat resistance based on thermal weight loss is discussed.

EXAMPLES

Now, the present invention will be specifically described below by showing Examples and Comparative Examples. It is to be noted that the following Examples are for specific description of the present invention. Accordingly, the scope of the present invention is not to be restricted to or by the Examples, and modifications can be freely made within the scope of the inventive idea as set forth in the claims.

It is to be noted that the material compositional ratios set forth in Tables 1 to 6 are weight ratios.

Samples and evaluation methods will be set forth below.
(1) Samples
(i) Epoxy Resin
AER-260 [bisphenol A type epoxy resin, produced by Asahi Kasei Epoxy Co., Ltd., epoxy equivalent: about 190 g/eq]
(ii) Acid Anhydrides
HN-2200 [3- or 4-methyl-1,2,3,6-tetrahydrophthalic anhydride, produced by Hitachi Chemical Co., Ltd., acid anhydride equivalent: 166 g/eq, an acid anhydride having an unsaturated double bond in its structure]
MHAC-P [methyl-3,6-endomethylene-1,2,3,6-tetrahydrophthalic anhydride, produced by Hitachi Chemical Co., Ltd., acid anhydride equivalent: 178 g/eq, an acid anhydride having an unsaturated double bond in its structure]
HN-5500 [3- or 4-methylhexahydrophthalic anhydride, produced by Hitachi Chemical Co., Ltd., acid anhydride equivalent: 168 g/eq, an acid anhydride having an unsaturated double bond in its structure]
Maleic anhydride [produced by Wako Pure Chemical Industries Ltd., acid anhydride equivalent: 98 g/eq]
(iii) Polyfunctional Vinyl Monomer
M3130 [EO-modified trimethylolpropane triacrylate, produced by Toyo Chemicals Co., Ltd.]
(iv) Epoxy Resin Curing Catalyst
2E4MZ-CN [1-cyanoethyl-2-ethyl-4-methylimidazole, produced by Shikoku Chemicals Corporation]
(v) Radical Polymerization Catalyst
PERHEXYNE 25B [2,5-dimethyl-2,5-di(t-butylperoxy)hexyne-3, produced by NOF Corporation]
(vi) Crushed Crystalline Silica
XJ-7 [crushed crystalline silica, produced by Tatsumori Ltd., average particle diameter: about 6.3 µm]
(vii) Acicular Inorganic Fillers
ALBOREX Y [aluminum borate whisker, produced by Shikoku Chemicals Corporation, average diameter: 0.1 to 1.0 µm, average length: 10 to 30 µm]
TISMO N [potassium titanate whisker, produced by Otsuka Chemical Co., Ltd., average diameter 0.3 to 0.6 µm, average length: 10 to 20 µm]
WHISCAL A [calcium carbonate whisker, produced by Maruo Calcium Co., Ltd., average diameter: 0.1 to 1 µm, average length: 20 to 30 µm]
(viii) Crosslinked Rubber Particles
Crosslinked acrylonitrile-butadiene rubber particles, average particle diameter: 50 to 100 nm
(viv) Core-Shell Rubber Particles
Core-shell rubber particles, average particle diameter: 100 to 500 nm
(x) Coupling Agents
S-180 [(2-n-butoxycarbonylbenzoyloxy)-tributoxytitanium, produced by Nippon Soda Co., Ltd.]
KBM-503 [3-methacryloxypropyltrimethoxysilane, produced by Shin-Etsu Chemical Co., Ltd.]
KBM-403 [3-glycidoxypropyltrimethoxysilane, produced by Shin-Etsu Chemical Co., Ltd.]

(2) Preparation of Varnish

The components were blended together in predetermined blending ratios, followed by stirring for 3 minute by use of a rotation-revolution mixer Model AR-100, produced by Thinky, to prepare a varnish.

(3) Production of Cured Product

The varnish was poured into an aluminum cup having a diameter of 45 mm and a depth of 5 mm, and was subjected to multistage heating in air. The multistage heating was composed of heating at 100° C. for 1 hour, heating at 110° C. for 1 hour, heating at 140° C. for 1 hour, and heating at 170° C. for 15 hours.

(4) Thermogravimetric Analysis (TGA)

A resin piece weighing about 20 mg was blanked from each cured product, to be a sample. Each sample were subjected to thermogravimetric analysis in air at rates of temperature rise of 5° C., 10° C., and 20° C. Under each temperature rise condition, the temperature (absolute temperature T5, T10, T20) at which the amount of organic components in the cured product was lost by 5 wt % was observed.

(5) Calculation of Activation Energy

As shown in FIG. 1, data obtained above were plotted, with logarithm of rate of temperature rise (long(5), log(10), log(20)) on the axis of abscissas and with reciprocal of 5 wt % weight loss temperature (1/T5, 1/T10, 1/T20) on the axis of ordinates, and the plot was approximated by a straight line. The absolute value "a" of the gradient of the straight line was substituted into Equation 2, to obtain the activation energy (E) based on the 5% weight loss.

(6) Calculation of Heat Resistant Temperature Index

Figure 2:
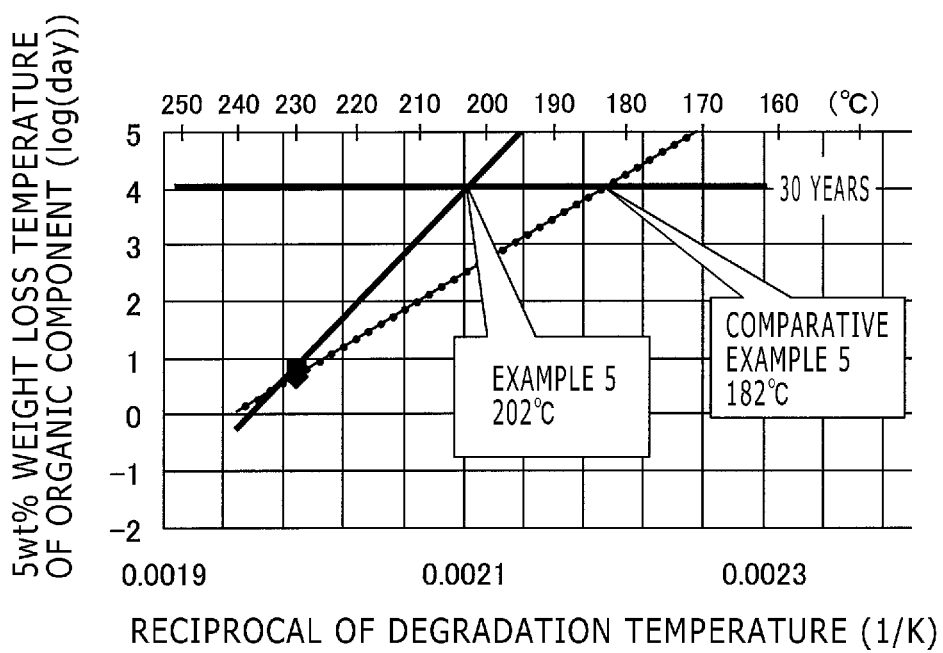
FIG. 2 is a graph showing the relationship between 5% weight loss time and the reciprocal of degradation temperature, in thermogravimetry of organic components of an epoxy-vinyl copolymerization type resin composition according to the present invention.

FIG. 2 is a graph showing the relationship between 5% weight loss time and reciprocal of degradation temperature, in thermogravimetric analysis of a cured product of the epoxy-vinyl copolymerization type resin composition according to the present invention. The cured product prepared previously was served to observation of initial weight. Next, the sample was placed in a thermostat set to 230° C. in air. Then, the relationship between heating time and ratio of weight loss was examined, and 5 wt % weight loss time (t) of organic components in the cured product was determined. The previously obtained activation energy (E) and the 5 wt % weight loss time (t) were substituted into Equation 3 set forth below, then the intercept (b) was determined, and an Arrhenius plot was formed. This is shown in FIG. 2. From this plot, the temperature at which the amount of organic components in the cured product will be lost by 5 wt % after 30 years was determined as heat resistant temperature index.

$$\mathrm{Log}(t) = E/(RT) + b \qquad \text{Equation 3}$$

t: time (days) required for weight loss of organic components in the cured product to reach 5 wt %

E: activation energy (J/mol)

R: gas constant=8.3122621 (J/K·mol)

b: intercept of Arrhenius plot

It is to be noted that the unit of the activation energy E (kcal/mol) can be converted by the following Equation 4.

$$1 \text{ kcal/mol} = 4184 \text{ J/mol} \qquad \text{Equation 4}$$

(7) Crack Resistance Test

Figure 4A:
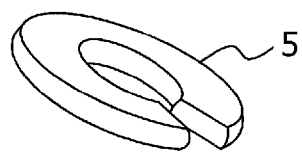
FIG. 4A is a schematic perspective view of a SUS309S-made C-type washer for use in a crack resistance test.
Figure 4B:
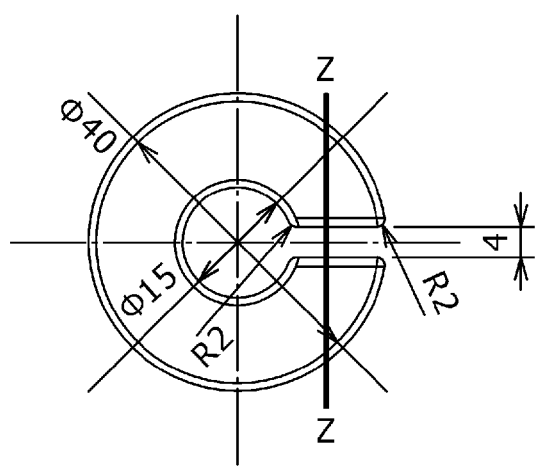
FIG. 4B is a plan view of FIG. 4A.
Figure 4C:
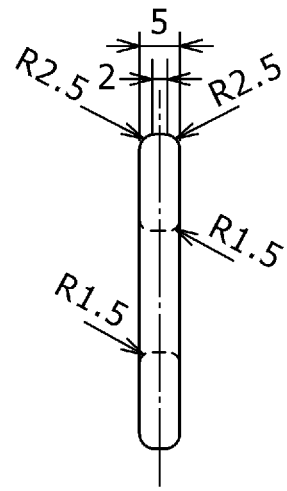
FIG. 4C is a side view of FIG. 4A.
Figure 4D:
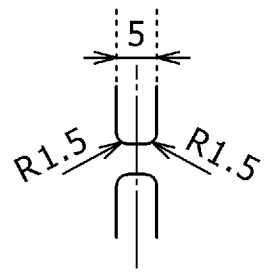
FIG. 4D is a sectional view taken along line Z-Z in FIG. 4B.

Using FIGS. 4A to 4D and FIGS. 5A and 5B, a method for crack resistance test in Examples and Comparative Examples will be described below. FIG. 4A is a schematic perspective view of a SUS309S-made C-type washer for use in the crack resistance test. FIG. 4B is a plan view of FIG. 4A, FIG. 4C is a side view of FIG. 4A, and FIG. 4D is a sectional view taken along line Z-Z in FIG. 4B. In the drawings, R denotes curvature, and φ denotes diameter. Besides, the dimensions in the drawings are all expressed in millimeters. The same applies also to FIGS. 5B and 6B described later.

Figure 5A:
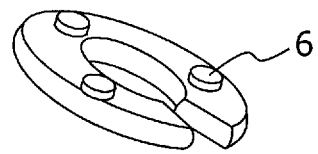
FIG. 5A is a schematic perspective view of a SUS309S-made C-type washer for use in a crack resistance test.
Figure 5B:
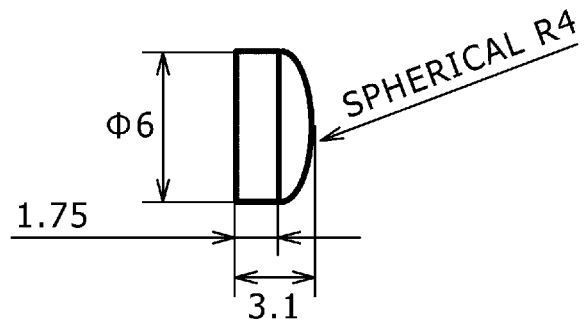
FIG. 5B is a sectional view of screw 6 shown in FIG. 5A.

FIG. 5A is a schematic perspective view of a SUS309S-made C-type washer for use in the crack resistance test. FIG. 5B is a sectional view of screw 6 shown in FIG. 5A.

Figure 6A:
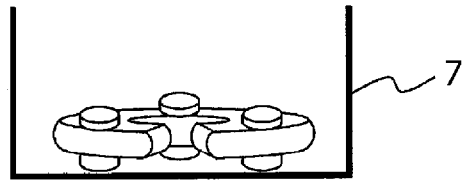
FIG. 6A is a schematic view showing a condition where the SUS903S-made C-type washer shown in FIG. 5A is subjected to a mold release treatment and is placed in a cup 7.
Figure 6B:
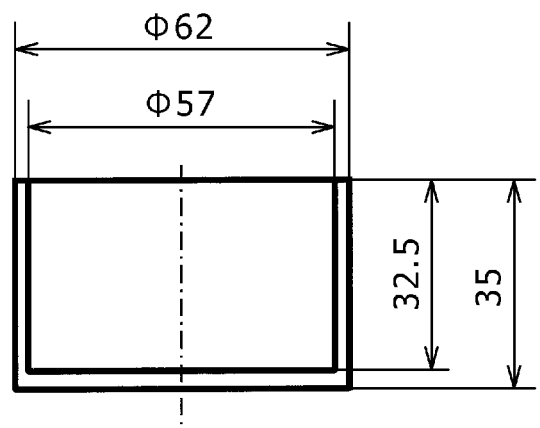
FIG. 6B is a sectional view of the cup 7 shown in FIG. 6A.

FIG. 6A is a schematic view showing a condition where the SUS903S-made C-type washer shown in FIG. 5A is subjected to a mold release treatment and is placed in a cup 7. FIG. 6B is a sectional view of the cup 7 shown in FIG. 6A.

Figure 7A:
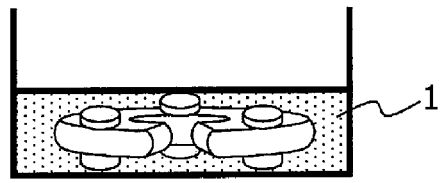
FIG. 7A is a schematic view showing a condition where a predetermined varnish is poured into a cup 7 in which the SUS309S-made C-type washer for use in a crack resistance test has been placed, and the varnish is subjected to a curing treatment.
Figure 7B:
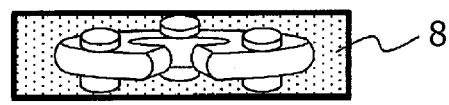
FIG. 7B is a schematic view of a sample (with the C-type washer embedded in a cured product) produced in FIG. 7A.

FIG. 7A is a schematic view showing a condition where a predetermined varnish is poured into a cup 7 in which the SUS309S-made C-type washer for use in the crack resistance test has been placed, and the varnish is subjected to a curing treatment. Besides, FIG. 7B is a schematic view of a sample (with the C-type washer embedded in a cured product) produced in FIG. 7A.

Figure 8:
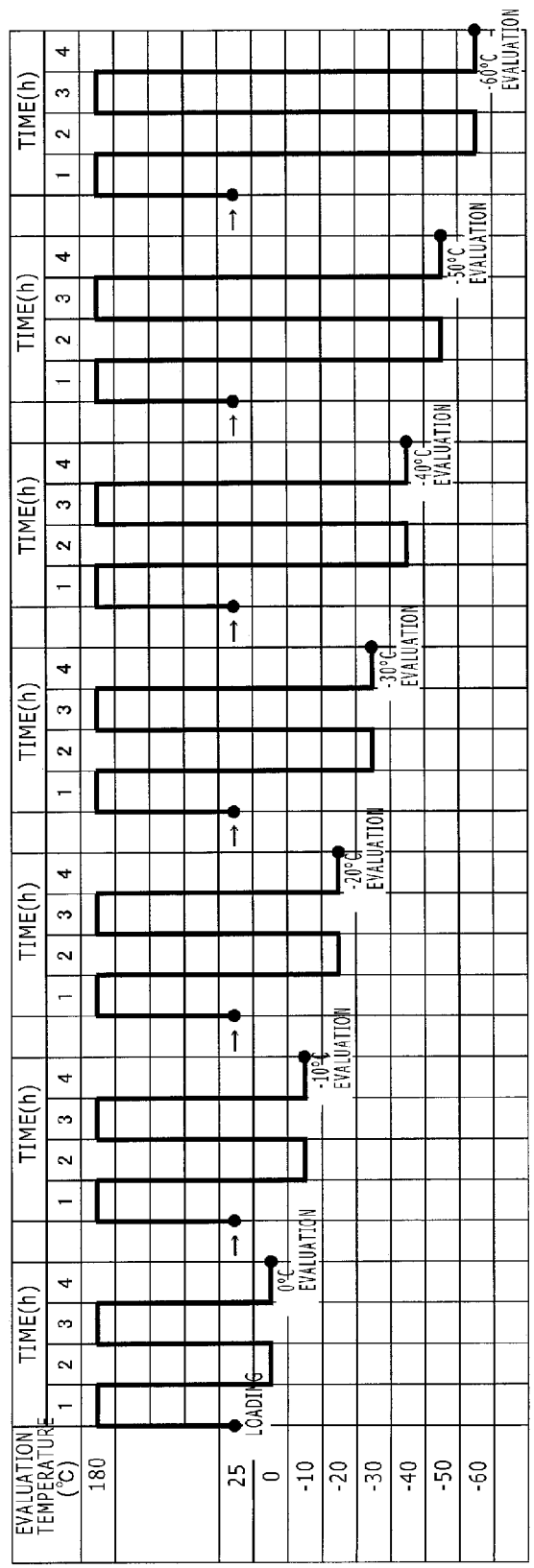
FIG. 8 is a diagram showing conditions of thermal shocks (temperature and time) in a crack resistance test.

FIG. 8 is a diagram showing conditions of thermal shocks (temperature and time) in the crack resistance test.

To both surfaces of the SUS309S-made C-type washer shown in FIG. 4A, the SUS309S-made screws 6 shown in FIG. 5A were adhered by use of an adhesive. As shown in FIG. 6A, this C-type washer was subjected to a mold release treatment, and was placed in the center of the cup 7. A predetermined varnish was poured into this cup, and was cured by multistage heating composed of heating at 100° C. for 1 hour, heating at 110° C. for 1 hour, heating at 140° C. for 1 hour, and heating at 180° C. for 15 hours. As shown in FIGS. 7A and 7B, the sample with the C-type washer embedded therein was taken out of the SUS903S-made cup, and the status of generation of cracks upon curing was checked. Next, thermal shocks as shown in FIG. 8 were applied to the sample with the C-type washer embedded therein, and the lowest temperature at which cracking did not occur was observed as thermal crack resistance. This crack resistance test will hereinafter be referred to as C-type washer test.

(8) Measurement of Viscosity

The cured products of the epoxy-vinyl copolymerization type resin compositions according to the present invention were put to viscosity measurement, using an E-type viscometer produced by Tokimec, Inc. The measurement was conducted under the conditions of rotor revolution rates of 2.5 to 100 rpm and measurement temperature of 17° C.

Comparative Example 1

The composition of a varnish and evaluation results in Comparative Example 1 are set forth in Table 1. Comparative Example 1 is an example of an acid anhydride curing type epoxy resin in which the acid anhydride HN-5500 having no unsaturated double bond in its structure was used as a curing agent. The activation energy of the cured product of the resin was 32 kcal/mol. The viscosity of the varnish was 1946 mPa·s.

Comparative Example 2

The composition of a varnish and evaluation results in Comparative Example 2 are set forth in Table 1. Comparative Example 2 is an example in which M3130 was blended as a polyfunctional vinyl monomer into the composition of Comparative Example 1. The activation energy of the cured product of the composition in this example was 26 kcal/mol. In an acid anhydride curing type epoxy resin in which an acid anhydride having no unsaturated double bond is used as a curing agent, copolymerization with the polyfunctional vinyl monomer does not occur. In this example, accordingly, enhancement of activation energy was not recognized, but, on the contrary, a lowering in activation energy was observed. From this fact, it was presumed that the cured product obtained using M3130 alone is lower in heat resistance than the cured product of the acid anhydride curing type epoxy resin of Comparative Example 1. The viscosity of the varnish was 227 mPa·s.

TABLE 1

| Composition of Varnish | | | |
|---|---|---|---|
| Substance Name | Product Name | Comp. Ex. 1 | Comp. Ex. 2 |
| Epoxy resin | AER-260 (190 g/eq) | 100 | 100 |
| Acid anhydride | HN-5500 (168 g/mol) | 88 | 88 |
| Polyfunctional vinyl monomer | M3130 | 0 | 188 |
| Epoxy resin curing catalyst | 2E4MZ-CN | 0.25 | 0.25 |
| Radical polymerization catalyst | PERHEXYNE 25B | 0 | 2.2 |
| Activation energy (kcal/mol) | | 32 | 25 |
| Varnish viscosity (mPa · s) | | 1946 | 227 |

Comp. Ex.: Comparative Example

Comparative Example 3

The composition of a varnish and evaluation results in Comparative Example 3 are set forth in Table 2. Comparative Example 3 is an example of an acid anhydride curing type epoxy resin in which an acid anhydride HN-2200 having an unsaturated double bond in its structure is used as a curing agent. The activation energy of the cured product of the resin was 25 kcal/mol. The viscosity of the varnish was 781 mPa·s (at 17° C., here and hereafter).

Examples 1 to 3

The compositions of varnishes and evaluation results in Examples 1 to 3 are set forth in Table 2. Examples 1 to 3 are examples in which M3130 was blended as a polyfunctional vinyl monomer into the composition of Comparative Example 3. It was clearly found that the activation energy increases with an increase in the amount of M3130. There were obtained the results which suggest that in an acid anhydride curing type epoxy resin using as a curing agent an acid anhydride having an unsaturated double bond in its structure, blending a polyfunctional vinyl monomer in the system leads to formation of a copolymer of both the epoxy resin and the vinyl monomer, resulting in an enhanced heat resistance. The viscosity of the varnish in Example 1 was 576 mPa·s, the viscosity of the varnish in Example 2 was 282 mPa·s, and the viscosity of the varnish in Example 3 was 205 mPa·s.

Comparative Example 4

The composition of a varnish and evaluation results in Comparative Example 4 are set forth in Table 3. Comparative Example 4 is an example of an acid anhydride curing type epoxy resin in which an acid anhydride MHAC-P having an unsaturated double bond in its structure is used as a curing agent. The activation energy of the cured product of the resin was 39 kcal/mol. The viscosity of the varnish was 2560 mPa·s.

Example 4

The composition of a varnish and evaluation results in Example 4 are set forth in Table 2. Example 4 is an example in which M3130 was blended as a polyfunctional vinyl monomer into the composition of Comparative Example 4, and, further, 32 mol % of the MHAC-P was replaced by maleic anhydride. The activation energy in Example 4 was 55 kcal/mol, a very high value as compared with those in Comparative Example 4 and Examples 1 to 3. It was considered that blending of the maleic anhydride having high radical polymerizability together with M3130 used as the polyfunctional vinyl monomer caused formation of many copolymerization structures between the epoxy resin and the polyfunctional vinyl monomer by way of the acid anhydride. Thus, there were obtained the results which suggest that in an acid anhydride curing type epoxy resin using as a curing agent an acid anhydride having an unsaturated double bond in its structure, blending of a polyfunctional vinyl monomer and maleic anhydride in the system causes efficient formation of a copolymer of the epoxy resin and the polyfunctional vinyl monomer, thereby resulting in a drastically enhanced heat resistance. The viscosity of the varnish was 538 mPa·s at 17° C. and 20 mPa·s at 60° C.

TABLE 3

| Composition of Varnish | | | |
|---|---|---|---|
| Substance Name | Product Name | Comp. Ex. 4 | Example 4 |
| Epoxy resin | AER-260 (190 g/eq) | 100 | 100 |
| Acid anhydride | HN-2200 (166 g/mol) | 0 | 0 |
| | MHAC-P(178 g/mol) | 93 | 63.23 |
| | Maleic anhydride (98 g/eq) | 0 | 15.9 |
| Polyfunctional vinyl monomer | M3130 | 0 | 83.8 |
| Epoxy resin curing catalyst | 2E4MZ-CN | 0.25 | 0.088 |
| Radical polymerization catalyst | PERHEXYNE 25B | 0 | 1 |
| Activation energy (kcal/mol) | | 39 | 55 |

TABLE 2

| Composition of Varnish | | | | | |
|---|---|---|---|---|---|
| Substance Name | Product Name | Comp. Ex. 3 | Example 1 | Example 2 | Example 3 |
| Epoxy resin | AER-260 (190 g/eq) | 100 | 100 | 100 | 100 |
| Acid anhydride | HN-2200 (166 g/mol) | 87 | 87 | 87 | 87 |
| Polyfunctional vinyl monomer | M3130 | 0 | 25 | 100 | 187 |
| Epoxy resin curing catalyst | 2E4MZ-CN | 0.25 | 0.25 | 0.25 | 0.25 |
| Radical polymerization catalyst | PERHEXYNE 25B | 0 | 0.3 | 1.2 | 2.2 |
| Activation energy (kcal/mol) | | 25 | 26 | 28 | 32 |
| Varnish viscosity (mPa · s) | | 781 | 576 | 282 | 205 |

TABLE 3-continued

| Composition of Varnish | | | |
|---|---|---|---|
| Substance Name | Product Name | Comp. Ex. 4 | Example 4 |
| Varnish viscosity at 17° C. (mPa · s) | | 2560 | 538 |
| Varnish viscosity at 60° C. (mPa · s) | | — | 20 |

Comparative Example 5

The composition of a varnish and evaluation results in Comparative Example 5 are set forth in Table 4. Comparative Example 5 is an example in which a silica XJ-7 was blended into the composition of Comparative Example 1, in an amount of 75 wt %. The activation energy of the cured product of the composition in this example was 32 kcal/mol. The evaluation results of heat resistance are shown in FIG. 2. The 5 wt % weight loss time based on the total amount of organic components at 230° C. was 5 days, and the heat resistant temperature index was calculated to be 182° C.

Example 5

The composition of a varnish and evaluation results in Example 5 are set forth in Table 4. Example 5 is an example in which a silica XJ-7 was blended into the composition of Example 4, in an amount of 75 wt %. The activation energy of the cured product of the composition in this example was 55 kcal/mol. The 5 wt % weight loss time based on the total amount of organic components at 230° C. was 7 days, and the heat resistant temperature index was calculated to be 202° C. All the values of the activation energy, 5 wt % weight loss time, and heat resistant temperature index were higher than those in Comparative Example 5. From this it was confirmed that the cured product of the epoxy-vinyl copolymerization type liquid resin composition is excellent in heat resistance.

TABLE 4

| Composition of Varnish | | | |
|---|---|---|---|
| Substance Name | Product Name | Comp. Ex. 5 | Example 5 |
| Main component | AER-260 (190 g/eq) | 100 | 100 |
| Curing agent | HN-5500 (168 g/mol) | 88 | 0 |
| | MHAC-P (178 g/mol) | 0 | 63.23 |
| | Maleic anhydride (98 g/eq) | 0 | 15.9 |
| Diluent | M3130 | 0 | 83.8 |
| Epoxy resin curing catalyst | 2E4MZ-CN | 0.25 | 0.088 |
| Radical polymerization catalyst | PERHEXYNE 25B | 0 | 1 |

TABLE 4-continued

| Composition of Varnish | | | |
|---|---|---|---|
| Substance Name | Product Name | Comp. Ex. 5 | Example 5 |
| Crushed crystalline Silica | XJ-7 | 565 | 812 |
| Coupling agent | KBM-403 | 0 | 4.5 |
| | KBM-503 | 0 | 2.1 |
| Activation energy (kcal/mol) | | 32 | 55 |
| 5 wt % weight loss time of organic component in cured product at 230° C. (days) | | 5 | 7 |
| Heat resistant temperature index (° C.) | | 182 | 202 |

Examples 6 to 8

The compositions of varnishes and the results of the C-type washer test in Examples 6 to 8 are set forth in Table 5. Example 6 is an example in which only crushed crystalline silica was blended as a fine particle component; Example 7 is an example in which crosslinked rubber particles and core-shell rubber particles were blended into the composition of Example 6; and Example 8 is an example in which crushed crystalline silica and an acicular inorganic filler were blended as fine particle components. The liquid varnishes with the fine particle component or components blended therein showed good castability, owing to the low viscosity of the base material of the varnish according to the prevent invention. From these results, it was shown that in addition to a low-viscosity property and a high heat resistance, it is possible to impart a high thermal conductivity and a low-thermal-expansion property in Example 6, it is possible to impart a high thermal conductivity, a low-thermal-expansion property and a high toughness in Example 7, and it is possible to impart a high thermal conductivity, a low-thermal-expansion property and a high strength in Example 8.

Examples 9 to 12

The compositions of varnishes and the results of the C-type washer test in Examples 9 to 12 are set forth in Table 5. Examples 9 to 12 are examples in which composite fine particles including crushed crystalline silica, an acicular inorganic filler, crosslinked rubber particles and core-shell rubber particles were blended as composite fine particles. Blending of the composite fine particles resulted in that cracks did not appear upon curing, and that the thermal shock crack resistance was 0° C. The thermal shock crack resistance of the resin composition described in Comparative Example 5, which is a liquid epoxy resin composition according to the related art, is also 0° C. From this it was confirmed that the crack resistance of the epoxy-vinyl copolymerization type insulating material was improved to a practically acceptable level by the blending of the composite fine particles.

TABLE 5

| Composition of Varnish | | Example 6 | Example 7 | Example 8 | Example 9 | Example 10 | Example 11 | Example 12 |
|---|---|---|---|---|---|---|---|---|
| Substance Name | Product Name | | | | | | | |
| Main component | AER-260 (190 g/eq) | 100 | 100 | 100 | 100 | 100 | 100 | 100 |
| Curing agent | MHAC-P (178 g/mol) | 63.27 | 63.27 | 63.27 | 63.27 | 63.27 | 63.27 | 63.27 |
| | Maleic anhydride (98 g/eq) | 15.92 | 15.92 | 15.92 | 15.92 | 15.92 | 15.92 | 15.92 |
| Diluent | M3130 | 41.94 | 41.94 | 41.94 | 41.94 | 41.94 | 41.94 | 83.88 |
| Epoxy resin curing catalyst | 2E4MZ-CN | 0.09 | 0.09 | 0.09 | 0.09 | 0.09 | 0.09 | 0.09 |
| Radical polymerization catalyst | PERHEXYNE 25B | 0.51 | 0.51 | 0.51 | 0.51 | 0.51 | 0.51 | 0.88 |
| Coupling agent | KBM-403 | 5.31 | 5.31 | 5.31 | 5.31 | 5.31 | 4.11 | 5.31 |
| | S-181 | 0 | 0 | 0 | 0 | 0 | 1.22 | 0 |

TABLE 5-continued

| Composition of Varnish | | | Example 6 | Example 7 | Example 8 | Example 9 | Example 10 | Example 11 | Example 12 |
|---|---|---|---|---|---|---|---|---|---|
| Substance Name | Product Name | | | | | | | | |
| Composite fine particle components | Crushed crystalline silica | XJ-7 | 540.82 | 540.82 | 530.61 | 530.61 | 530.61 | 530.61 | 271 |
| | Acicular inorganic filler | ALBOREX Y | 0 | 0 | 10.2 | 10.2 | 0 | 0 | 10.2 |
| | | TISMO N | 0 | 0 | 0 | 0 | 10.2 | 0 | 0 |
| | | WHISCAL A | 0 | 0 | 0 | 0 | 0 | 10.2 | 0 |
| | Crosslinked rubber particles | | 0 | 26.33 | 0 | 26.33 | 26.33 | 26.33 | 26.33 |
| | Core-shell rubber particles | | 0 | 15.31 | 0 | 15.31 | 15.31 | 15.31 | 15.31 |
| C-type washer test | Presence/absence of cracks upon curing | | present | present | present | absent | absent | absent | absent |
| | Thermal shock crack resistance (° C.) | | — | — | — | 0 | 0 | 0 | 0 |

Examples 13 to 17

The compositions of varnishes and the results of the C-type washer test in Examples 13 to 17 are set forth in Table 6. Examples 13 to 17 are examples in which the total amount of maleic anhydride and M3130 as radical polymerization components was reduced to 36.84 parts by weight based on 100 parts by weight of the epoxy resin. In the compositional ranges under this investigation, an extremely excellent thermal shock crack resistance of −30° C. or below was recognized upon the C-type washer test. There were obtained the results which suggest that the crack-resistant epoxy-vinyl copolymerization type liquid resin compositions of the present invention, which offer cured products having excellent heat resistance and thermal shock crack resistance, are suitable for use as an insulating material for electronic/electric apparatuses.

Example 18

Figure 3:
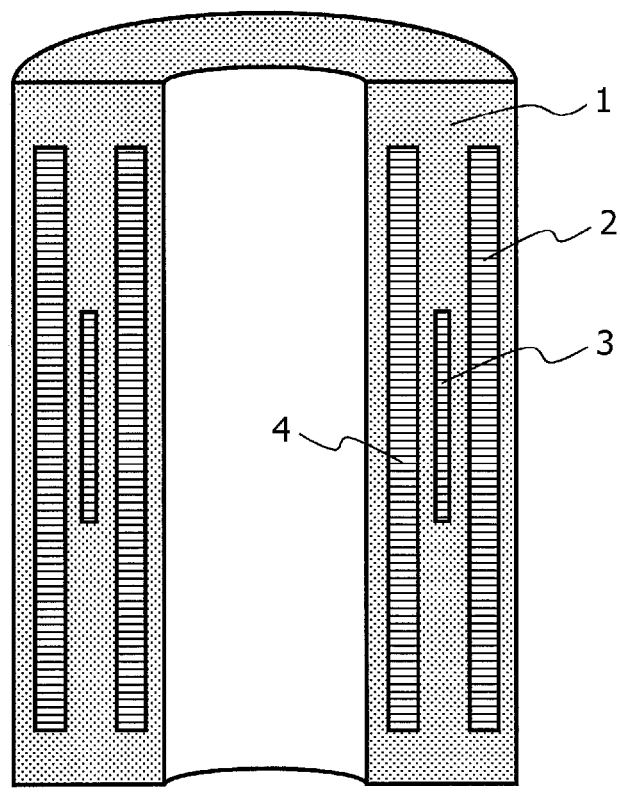
FIG. 3 is a schematic sectional view showing an example of a cast coil for a model transformer.

FIG. 3 is a schematic sectional view showing an example of a cast coil for model transformer. The epoxy-vinyl copolymerization type liquid resin composition described in Example 17 was prepared, in an amount of 25 kg. This liquid composition and a mold for the cast coil for model transformer were heated to 90° C. Next, 25 kg of the liquid resin composition was poured into the mold, followed by vacuum deaeration. The deaeration conditions were 90° C., 20 Pa, and 1 hour. Thereafter, curing was conducted in air at 100° C. for 5 hours, at 110° C. for 2 hours, at 140° C. for 2 hours, and at 180° C. for 15 hours. Subsequently, cooling down to 50° C. was carried out over 8 hours, and the mold was removed, to produce a cast coil for model transformer.

In FIG. 3, numeral 1 denotes a casting resin, 2 a shield coil, 3 a secondary coil, and 4 a primary coil. Since a transformer coil is well known, detailed description of it is omitted.

A section of the cast coil for model transformer was observed, upon which no crack or void was found. Thus, there were obtained the results which suggest that the electronic/electric apparatus fabricated using the epoxy-vinyl copolymer according to the present invention is excellent in heat resistance and crack resistance.

INDUSTRIAL APPLICABILITY

The present invention is effective as a heat resistance enhancing technique for acid anhydride curing type epoxy

TABLE 6

| Composition of Varnish | | | Example 13 | Example 14 | Example 15 | Example 16 | Example 17 |
|---|---|---|---|---|---|---|---|
| Substance Name | Product Name | | | | | | |
| Main component | AER-260 (190 g/eq) | | 100 | 100 | 100 | 100 | 100 |
| Curing agent | MHAC-P (178 g/mol) | | 63.27 | 63.27 | 63.27 | 63.27 | 63.27 |
| | Maleic anhydride (98 g/eq) | | 15.92 | 15.92 | 15.92 | 15.92 | 15.92 |
| Diluent | M3130 | | 20.92 | 20.92 | 20.92 | 20.92 | 20.92 |
| Epoxy resin curing catalyst | 2E4MZ-CN | | 0.09 | 0.09 | 0.09 | 0.09 | 0.09 |
| Radical polymerization catalyst | PERHEXYNE 25B | | 0.51 | 0.51 | 0.51 | 0.51 | 0.51 |
| Coupling agent | KBM-403 | | 5.31 | 5.31 | 1.22 | 1.22 | 1.22 |
| | S-181 | | 0 | 0 | 1.22 | 1.22 | 1.22 |
| Composite fine particle components | Crushed crystalline silica | XJ-7 | 530.61 | 515.31 | 530.61 | 530.61 | 530.61 |
| | Acicular inorganic filler | ALBOREX Y | 10.2 | 25.51 | 10.2 | 0 | 0 |
| | | TISMO N | 0 | 0 | 0 | 10.2 | 0 |
| | | WHISCAL A | 0 | 0 | 0 | 0 | 10.2 |
| | Crosslinked rubber particles | | 26.33 | 26.33 | 19.08 | 19.08 | 19.08 |
| | Core-shell rubber particles | | 15.31 | 15.31 | 10 | 10 | 10 |
| C-type washer test | Presence/absence of cracks upon curing | | absent | absent | absent | absent | absent |
| | Thermal shock crack resistance (° C.) | | −30 | −40 | ≤−60 | ≤−60 | ≤−60 | resins used as an insulating material and/or a structural material for various electronic/electric apparatuses. The epoxy-vinyl copolymerization type liquid resin compositions according to the present invention ensure that the low viscosity of the varnish can be maintained and the heat resistance of the cured products thereof can be enhanced. In addition, the epoxy-vinyl copolymerization type liquid resin compositions ensure that the low viscosity of the varnish can be maintained and the cured products thereof have high heat resistance and high crack resistance. Therefore, the epoxy-vinyl copolymerization type liquid resin compositions according to the present invention are suitable as a sealing material for electronic apparatuses, an impregnating and anchoring varnish for motor or generator coils, and a casting varnish for molded transformers, that are keenly demanded to show enhanced heat resistance.

DESCRIPTION OF REFERENCE NUMERALS

1: casting resin
2: shield coil
3: secondary coil
4: primary coil

The invention claimed is:

1. An epoxy-vinyl copolymerization type liquid resin composition containing:
   an epoxy resin having an epoxy equivalent of not more than 200 g/eq;
   an acid anhydride having an unsaturated double bond that is liquid at 25° C., further containing maleic anhydride in an amount of 1 to 33 mol % based on the total amount of the acid anhydride and maleic anhydride;
   a polyfunctional vinyl monomer which is liquid at 25° C.;
   an epoxy resin curing catalyst which accelerates a curing reaction of the epoxy resin with the acid anhydride and maleic anhydride; and
   a radical polymerization catalyst which accelerates a curing reaction of the polyfunctional vinyl monomer, wherein
   the resin composition is capable of forming, through curing, a cured product which is a copolymer of the epoxy resin, the acid anhydride and maleic anhydride, and the polyfunctional vinyl monomer.

2. The epoxy-vinyl copolymerization type liquid resin composition according to claim 1, further containing composite fine particles which include:
   crushed crystalline silica having an average particle diameter of 5 to 50 μm;
   an acicular inorganic filler having an average diameter of 0.1 to 3 μm and an average length of 10 to 50 μm;
   crosslinked rubber particles having an average particle diameter of 10 to 100 nm; and
   core-shell rubber particles having an average particle diameter of 100 to 2,000 nm.

3. The epoxy-vinyl copolymerization type liquid resin composition according to claim 2, wherein
   the composite fine particles contain 83 to 94% by weight of the crushed crystalline silica, 1 to 5% by weight of the acicular inorganic filler, 1 to 5% by weight of the crosslinked rubber particles, and 2 to 9% by weight of the core-shell rubber particles, based on the total amount of the composite fine particles, and
   the composite fine particles are contained in the resin composition in an amount of 50 to 76% by weight based on the total amount of the resin composition.

4. The epoxy-vinyl copolymerization type liquid resin composition according to claim 1, further containing composite fine particles which include:
   crushed crystalline silica having an average particle diameter of 5 to 50 μm;
   crosslinked rubber particles having an average particle diameter of 10 to 100 nm; and
   core-shell rubber particles having an average particle diameter of 100 to 2,000 nm.

5. The epoxy-vinyl copolymerization type liquid resin composition according to claim 1, further containing composite fine particles which include:
   crushed crystalline silica having an average particle diameter of 5 to 50 μm; and
   an acicular inorganic filler having an average diameter of 0.1 to 3 μm and an average length of 10 to 50 μm.

6. The epoxy-vinyl copolymerization type liquid resin composition according to claim 1, further containing composite fine particles which include crushed crystalline silica having an average particle diameter of 5 to 50 μm.

7. The epoxy-vinyl copolymerization type liquid resin composition according to claim 1, wherein
   the epoxy resin contains a bisphenol A type epoxy resin or/and a bisphenol F type epoxy resin having an epoxy equivalent of not more than 200 g/eq.

8. The epoxy-vinyl copolymerization type liquid resin composition according to claim 1, wherein
   the acid anhydride contains methyltetrahydrophthalic anhydride or/and methylnadic anhydride.

9. The epoxy-vinyl copolymerization type liquid resin composition according to claim 1, wherein
   the ratio of the number of equivalents of the acid anhydride and maleic anhydride to the number of equivalents of the epoxy resin is not less than 0.9 and less than 1.0, and
   the resin composition contains
      the polyfunctional vinyl monomer in an amount of 10 to 100 parts by weight based on 100 parts by weight in total of the epoxy resin and the acid anyhydride and maleic anhydride,
      the epoxy resin curing catalyst in an amount of 0.08 to 1.0 part by weight based on 100 parts by weight of the epoxy resin, and
      the radical polymerization catalyst in an amount of 0.5 to 2 parts by weight based on 100 parts by weight of the polyfunctional vinyl monomer.

10. The epoxy-vinyl copolymerization type liquid resin composition according to claim 1, wherein
    gelation time at 100° C. is not less than one hour.

* * * * *